(12) United States Patent
Misue et al.

(10) Patent No.: US 6,424,373 B1
(45) Date of Patent: Jul. 23, 2002

(54) APPARATUS AND METHOD FOR CAMERA CONTROL

(75) Inventors: Kazuo Misue; Kozo Sugiyama, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/008,567

(22) Filed: Jan. 16, 1998

Related U.S. Application Data

(63) Continuation of application No. 08/438,061, filed on May 8, 1995.

(30) Foreign Application Priority Data

May 26, 1994 (JP) .............................................. 6-113144

(51) Int. Cl.[7] .............................................. H04N 5/222
(52) U.S. Cl. .............. 348/211; 348/333.02; 348/333.12
(58) Field of Search ................................. 348/207, 211, 348/212, 213, 333.01, 333.02, 333.04, 333.05, 333.11, 333.12, 333.13, 441, 445, 36, 39, 143, 14.01, 14.05, 14.07, 14.15, 14.16; H04N 5/232

(56) References Cited

U.S. PATENT DOCUMENTS

| | | | | |
|---|---|---|---|---|
| 5,936,668 A | * | 8/1999 | Sawanobori et al. ........ | 348/333 |
| 5,999,214 A | * | 12/1999 | Inagaki ........................ | 348/211 |
| 6,008,837 A | * | 12/1999 | Yonezawa .................... | 348/15 |
| 6,008,844 A | * | 12/1999 | Tsuda et al. ................. | 348/334 |

FOREIGN PATENT DOCUMENTS

JP          A-3-217978          9/1991

* cited by examiner

*Primary Examiner*—Tuan Ho
(74) *Attorney, Agent, or Firm*—Staas & Halsey LLP

(57) ABSTRACT

An apparatus according to this invention for a coordination control between a window and a camera for use in displaying an image captured by the camera in the window of a display means comprises, a window control means for controlling the window according to a window operation command issued by a user, an information conversion means for converting window information supplied from the window control means into camera control information, and a camera control means for controlling the camera based on the camera control information supplied from the information conversion means. In this apparatus, the window information and the camera control information are interrelated for displaying the image.

8 Claims, 22 Drawing Sheets

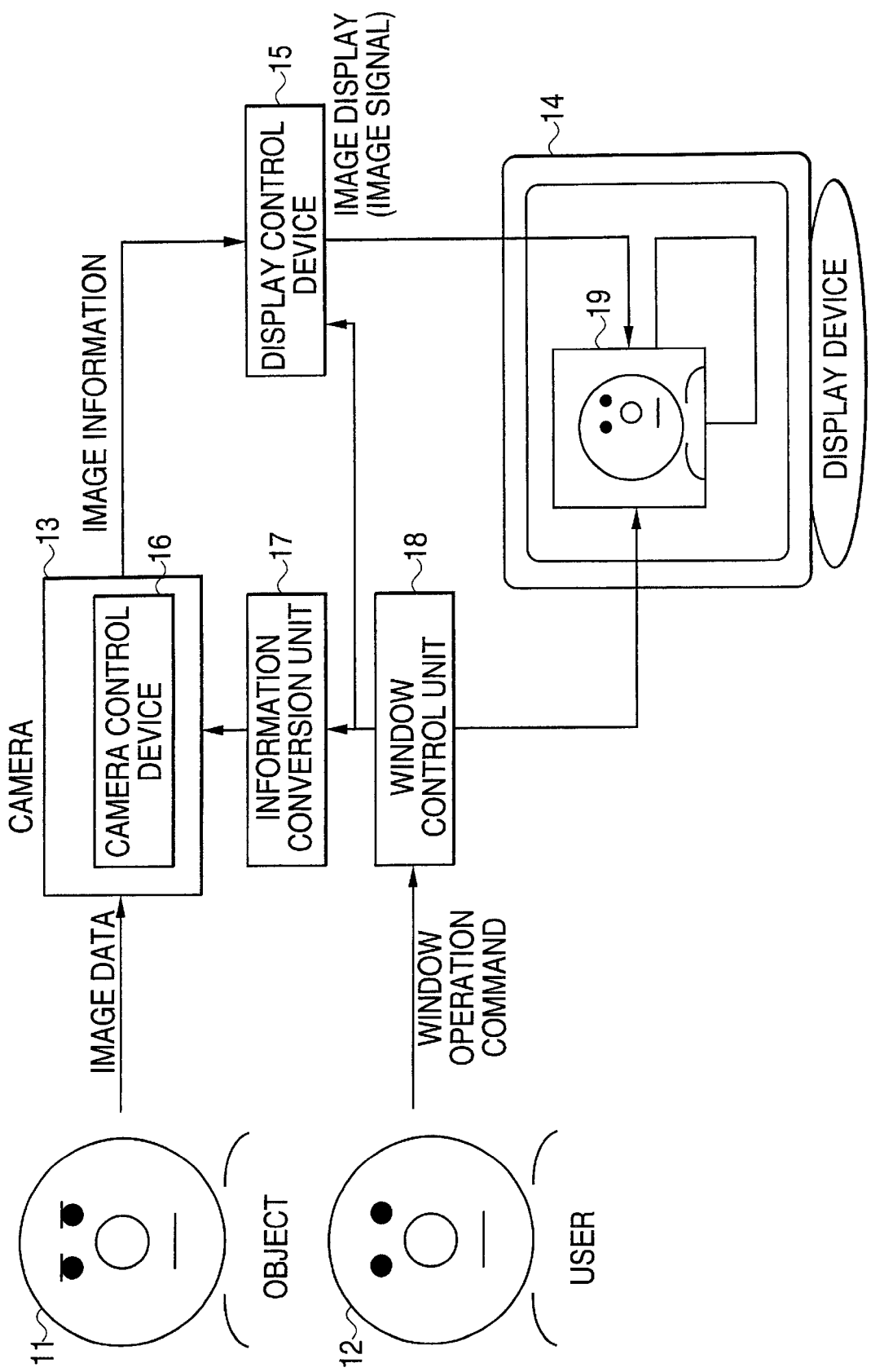

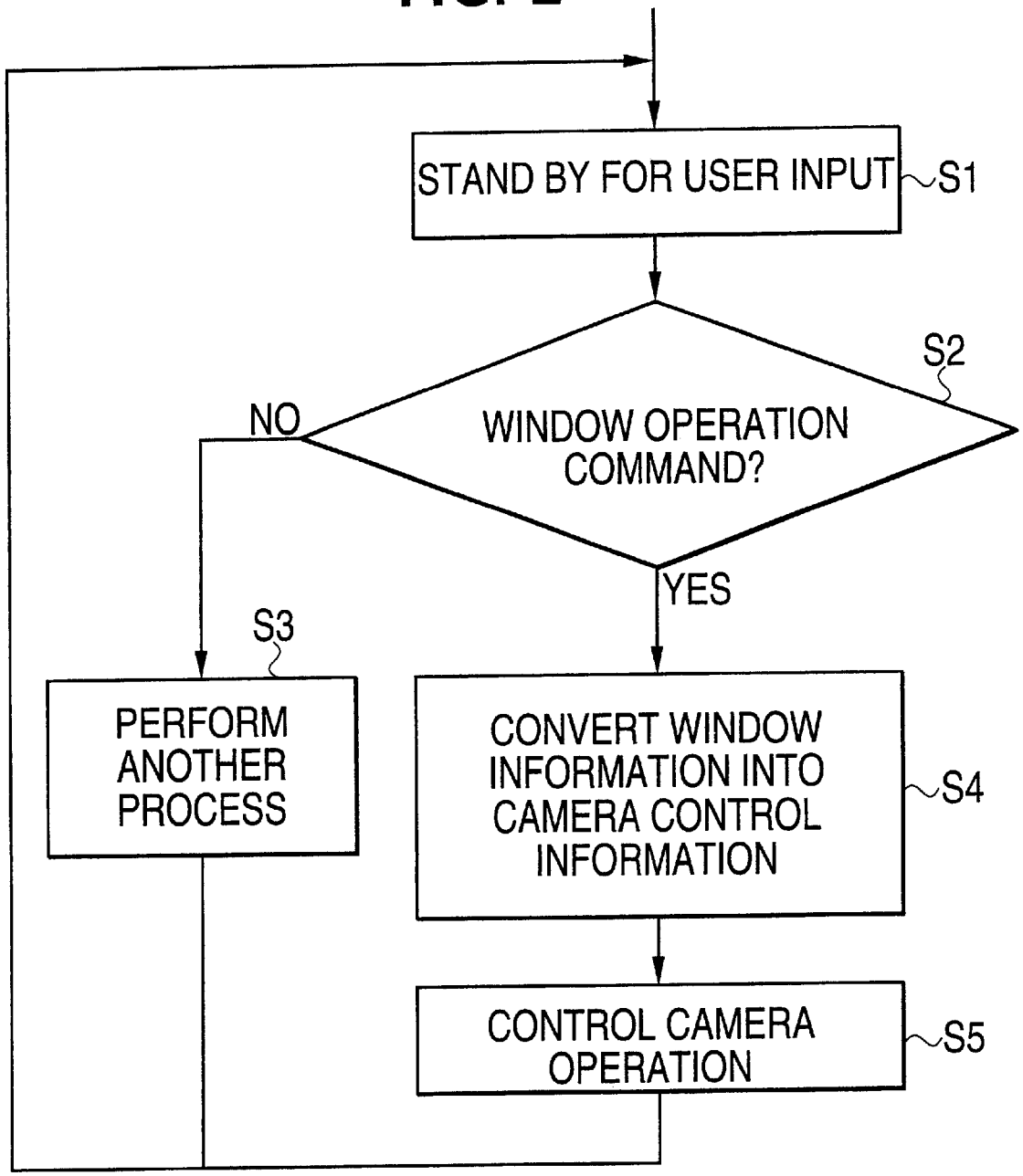

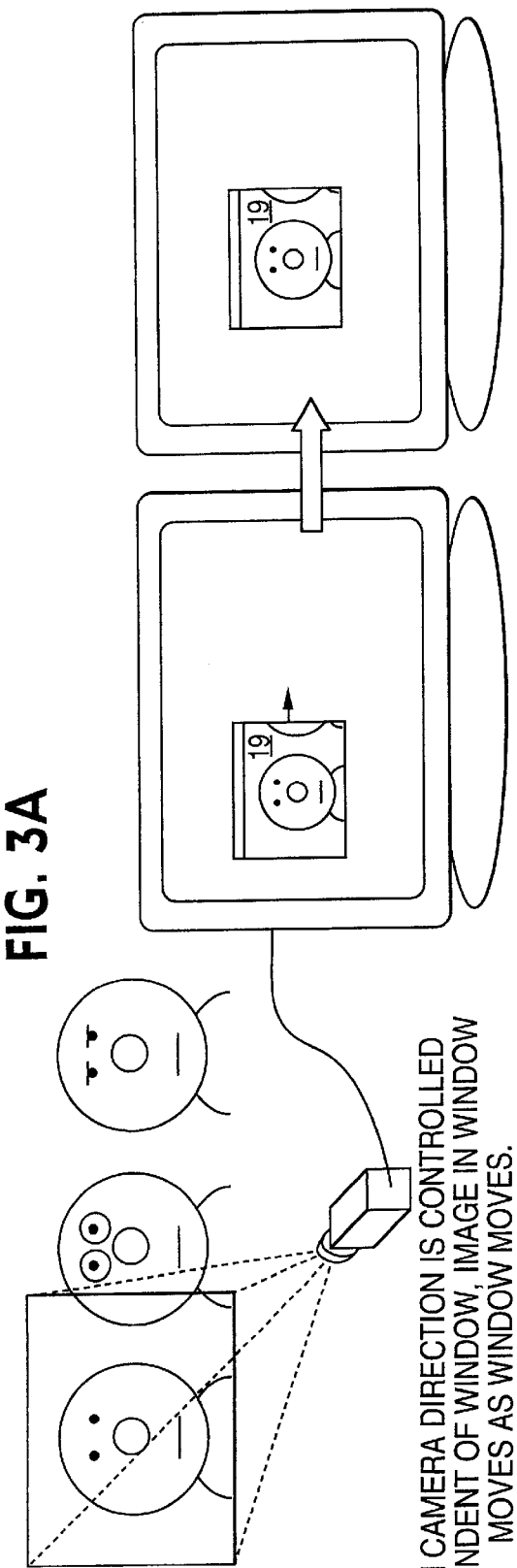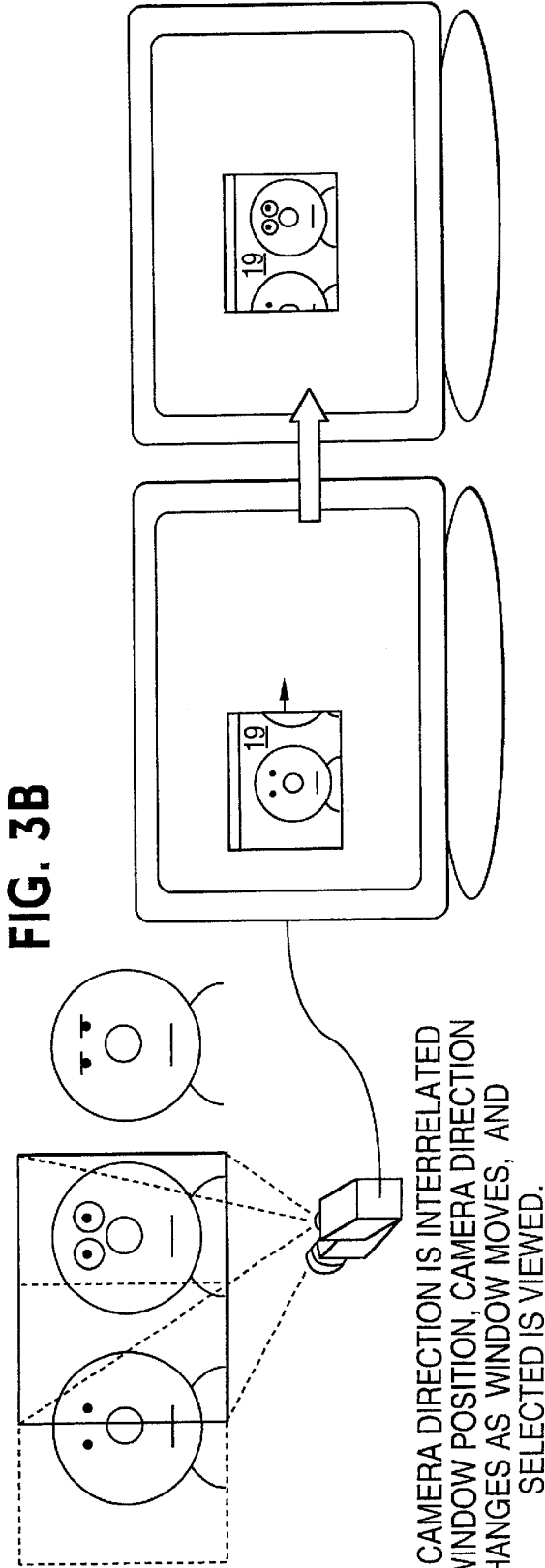

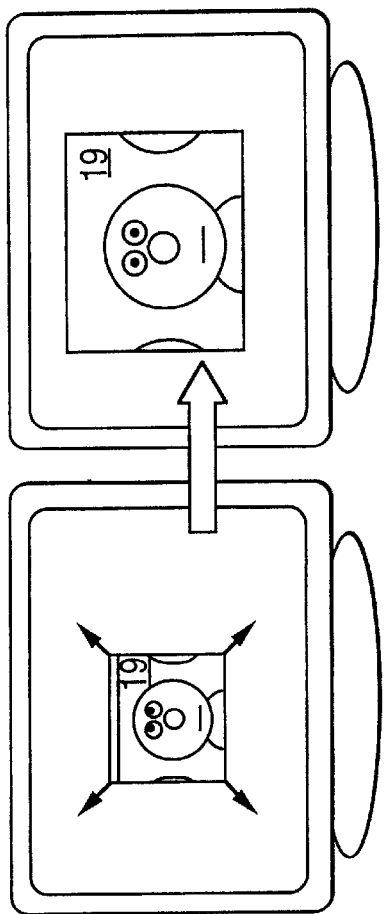
FIG. 4A
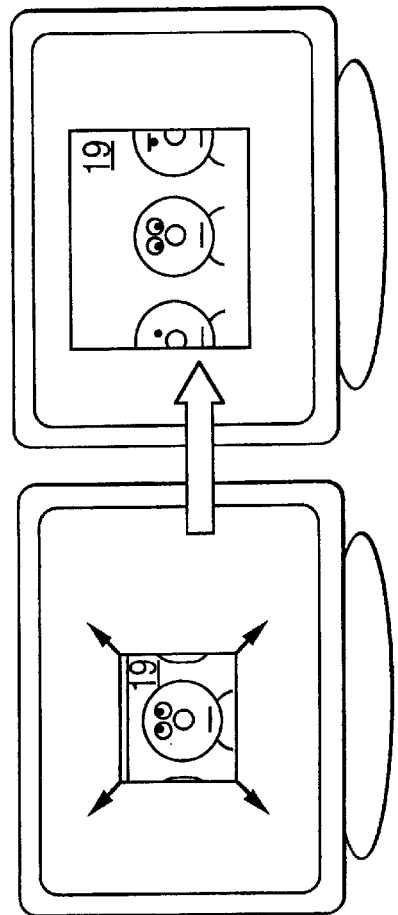
FIG. 4B
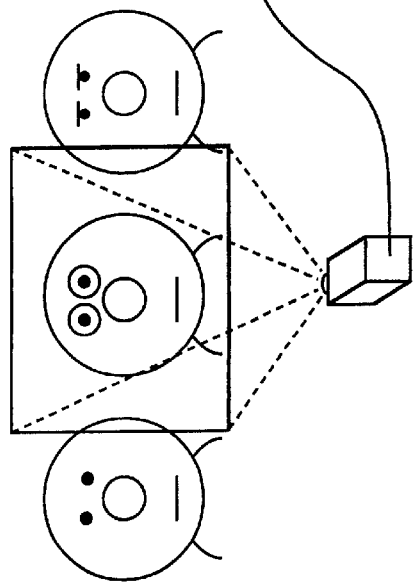
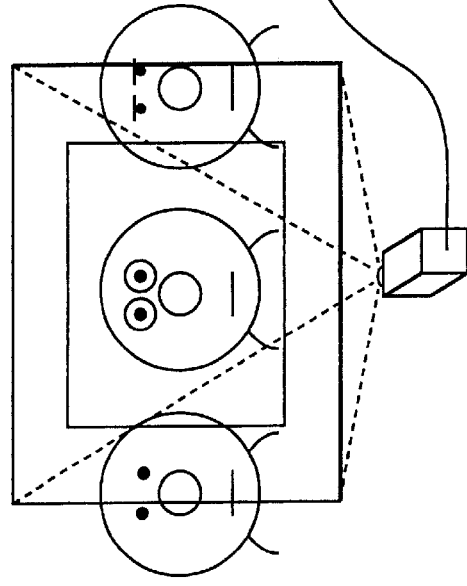

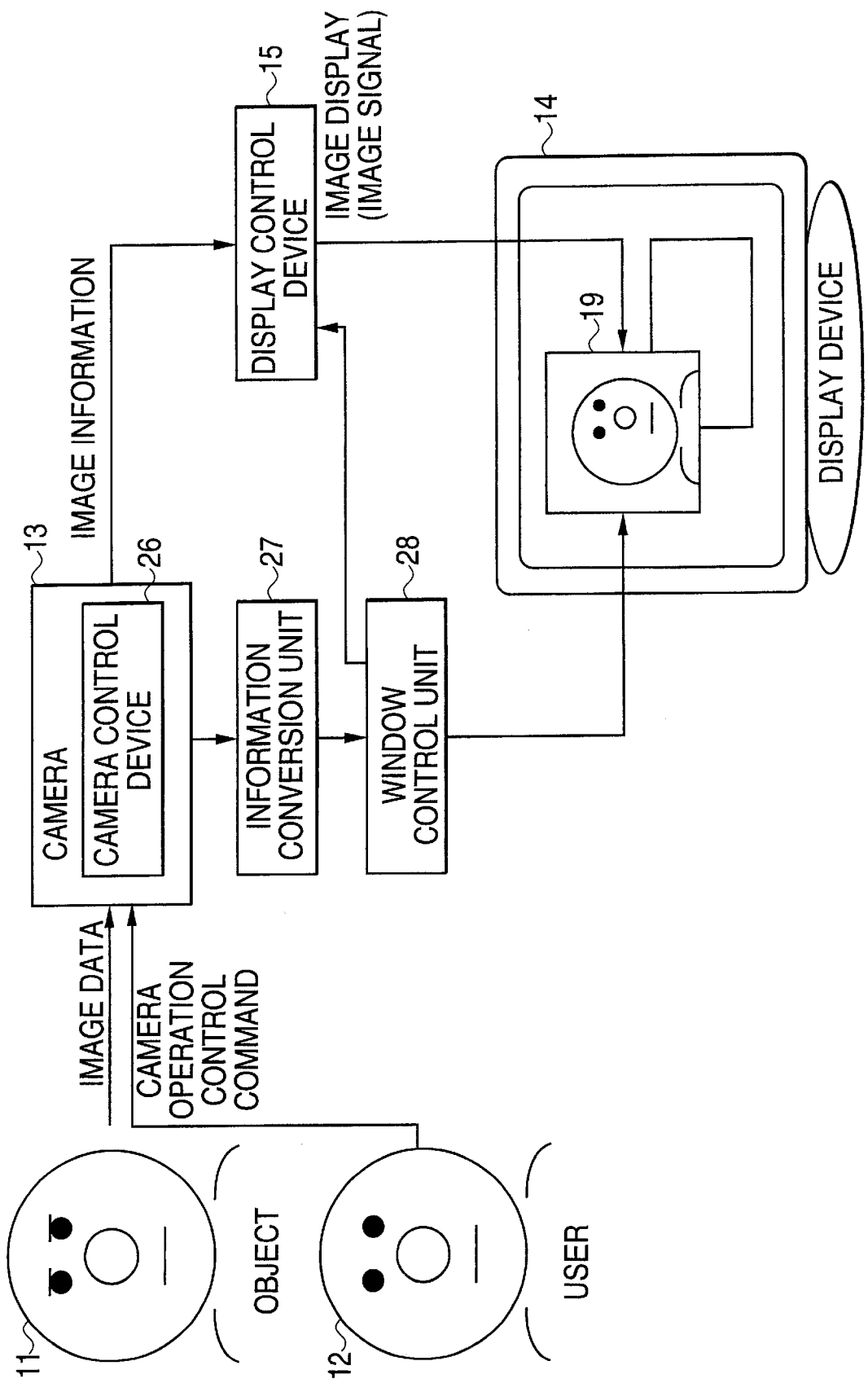

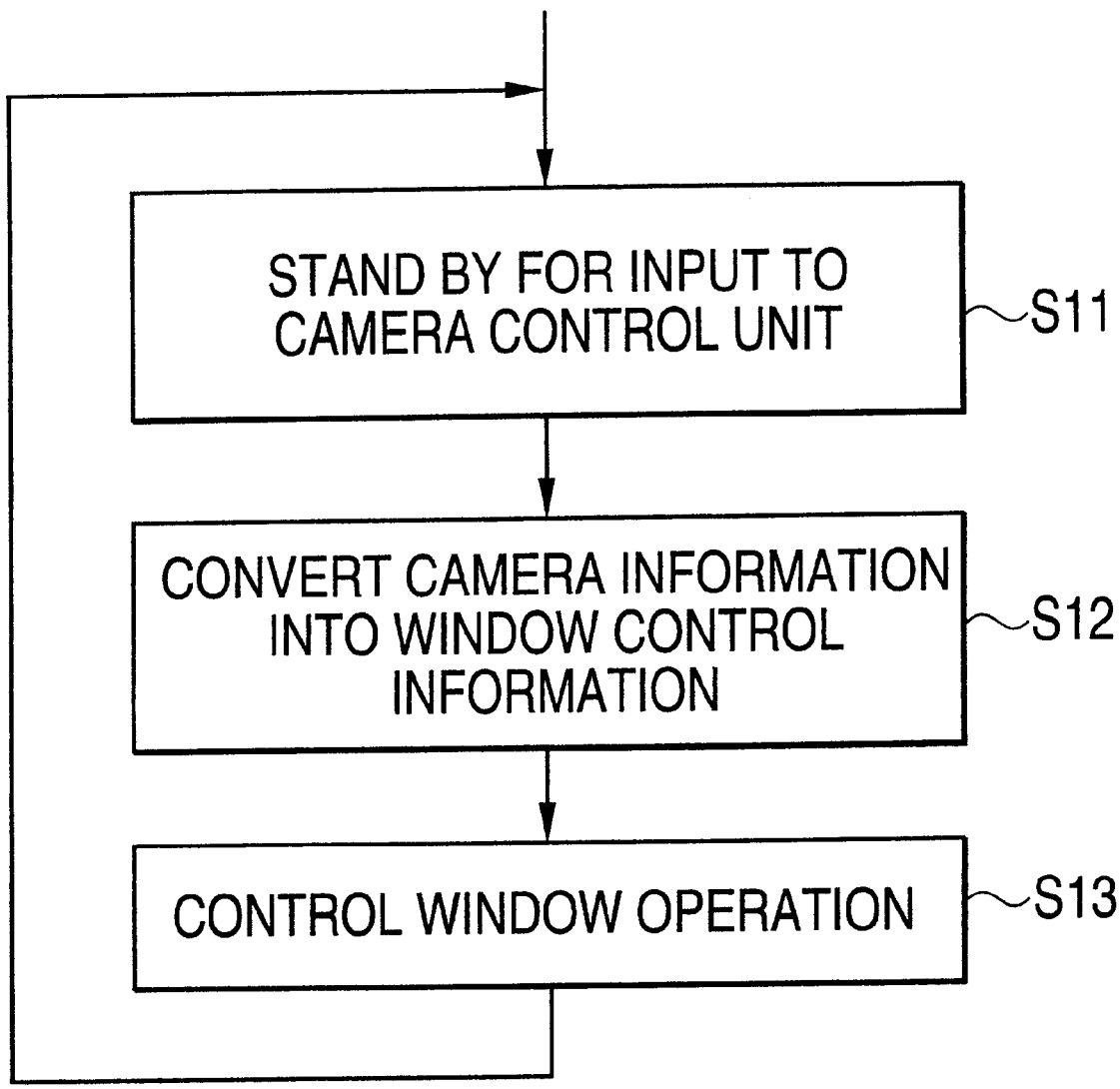

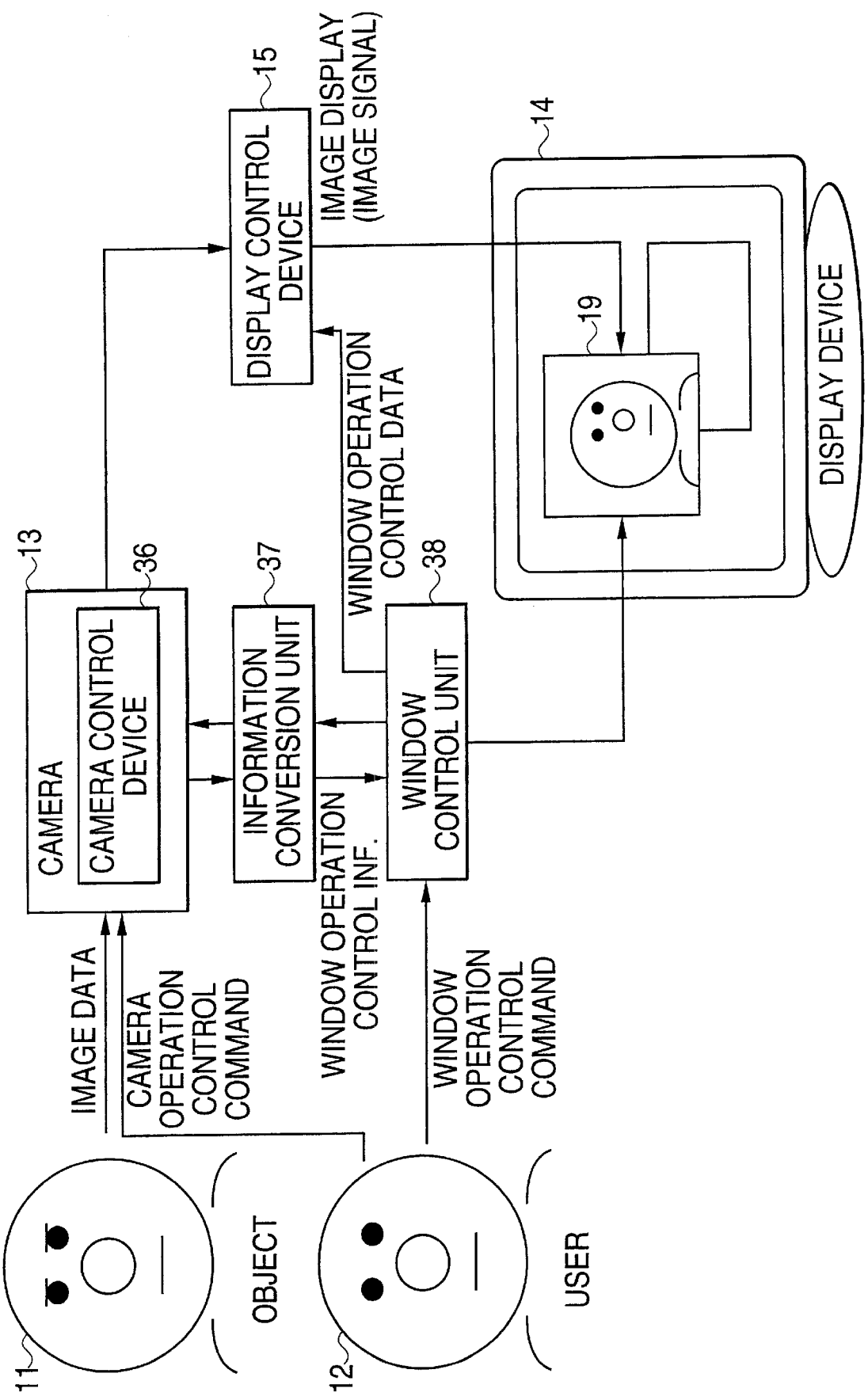

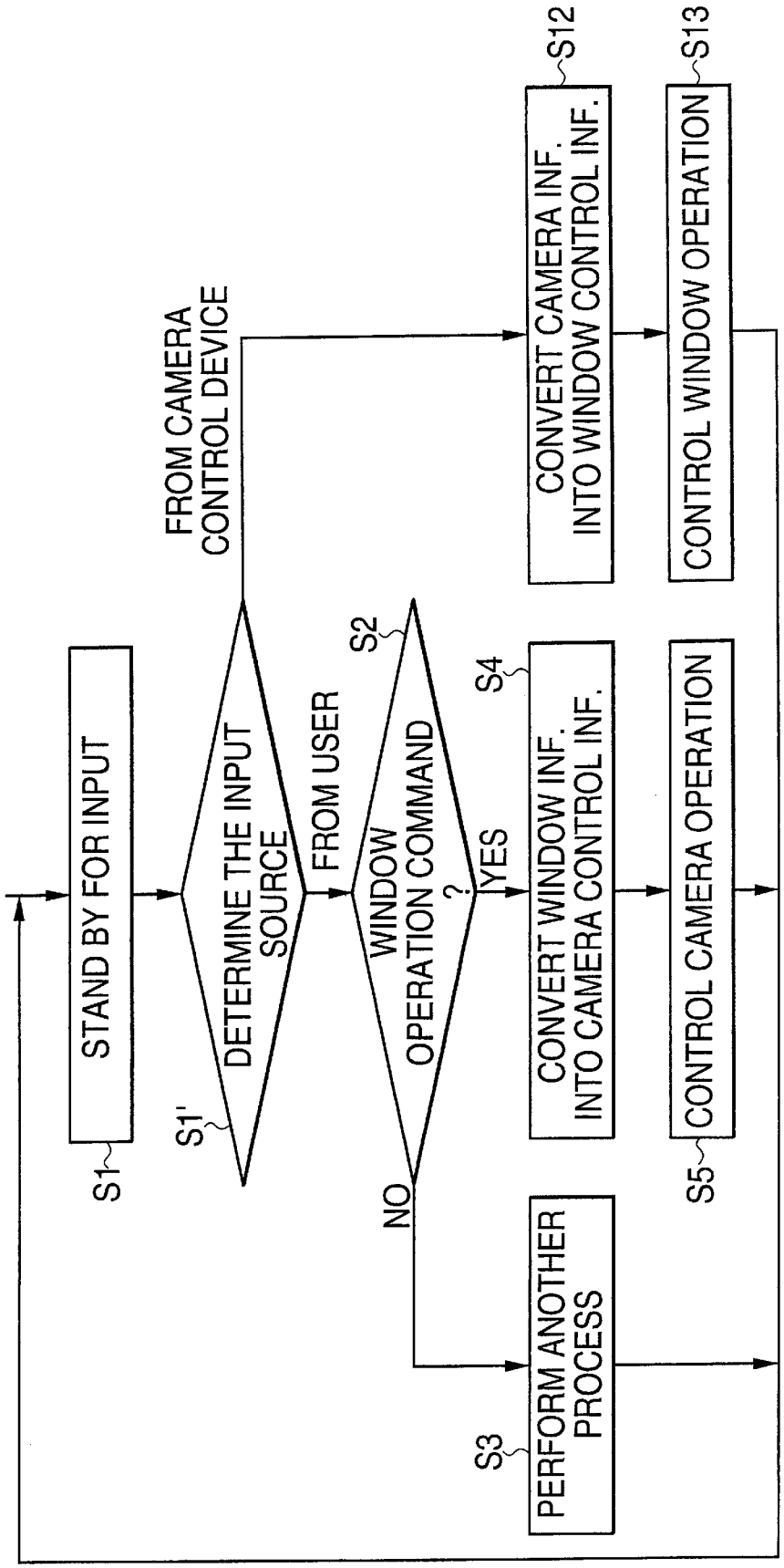

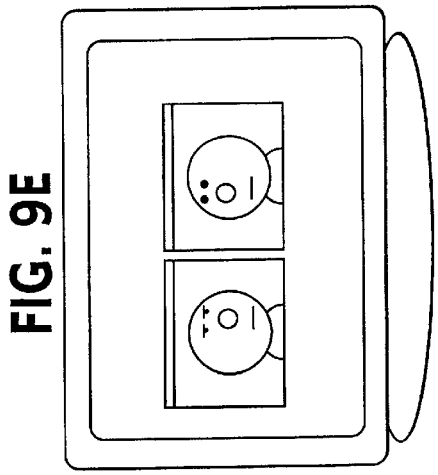

FIG. 9E

MATCHED FACIAL DIRECTIONS PRESENT A NATURAL IMPRESSION, WHERE TELECONFERENCE SYSTEM DISPLAYS PARTICIPANTS SIDE BY SIDE.

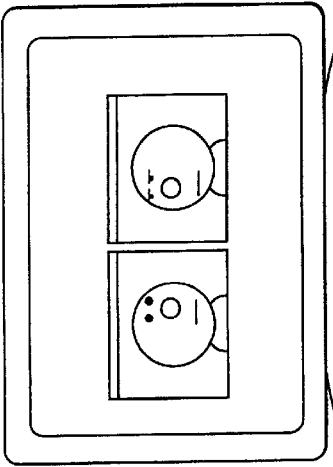

FIG. 9B

TELECONFERENCE SYSTEM DISPLAYING PARTICIPANTS SIDE BY SIDE PRESENTS NATURAL IMPRESSION.

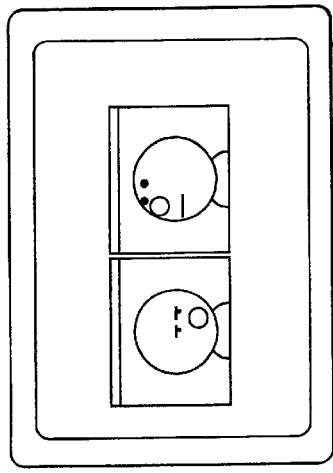

FIG. 9D

UNMATCHED FACIAL DIRECTIONS PRESENT AN UNNATURAL IMPRESSION, ALTHOUGH TELECONFERENCE SYSTEM DISPLAYS PARTICIPANTS SIDE BY SIDE.

FIG. 9A

GENERIC TELECONFERENCE SYSTEM DISPLAY FRONT VIEW.

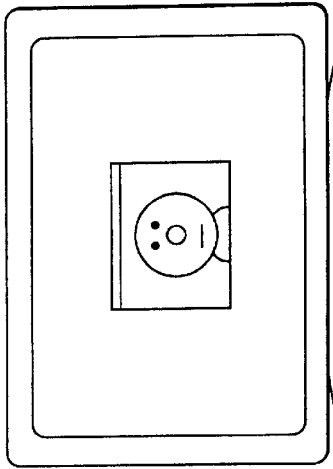

FIG. 9C

UNMATCHED FACIAL DIRECTIONS PRESENT AN UNNATURAL IMPRESSION, ALTHOUGH TELECONFERENCE SYSTEM DISPLAYS PARTICIPANTS SIDE BY SIDE.

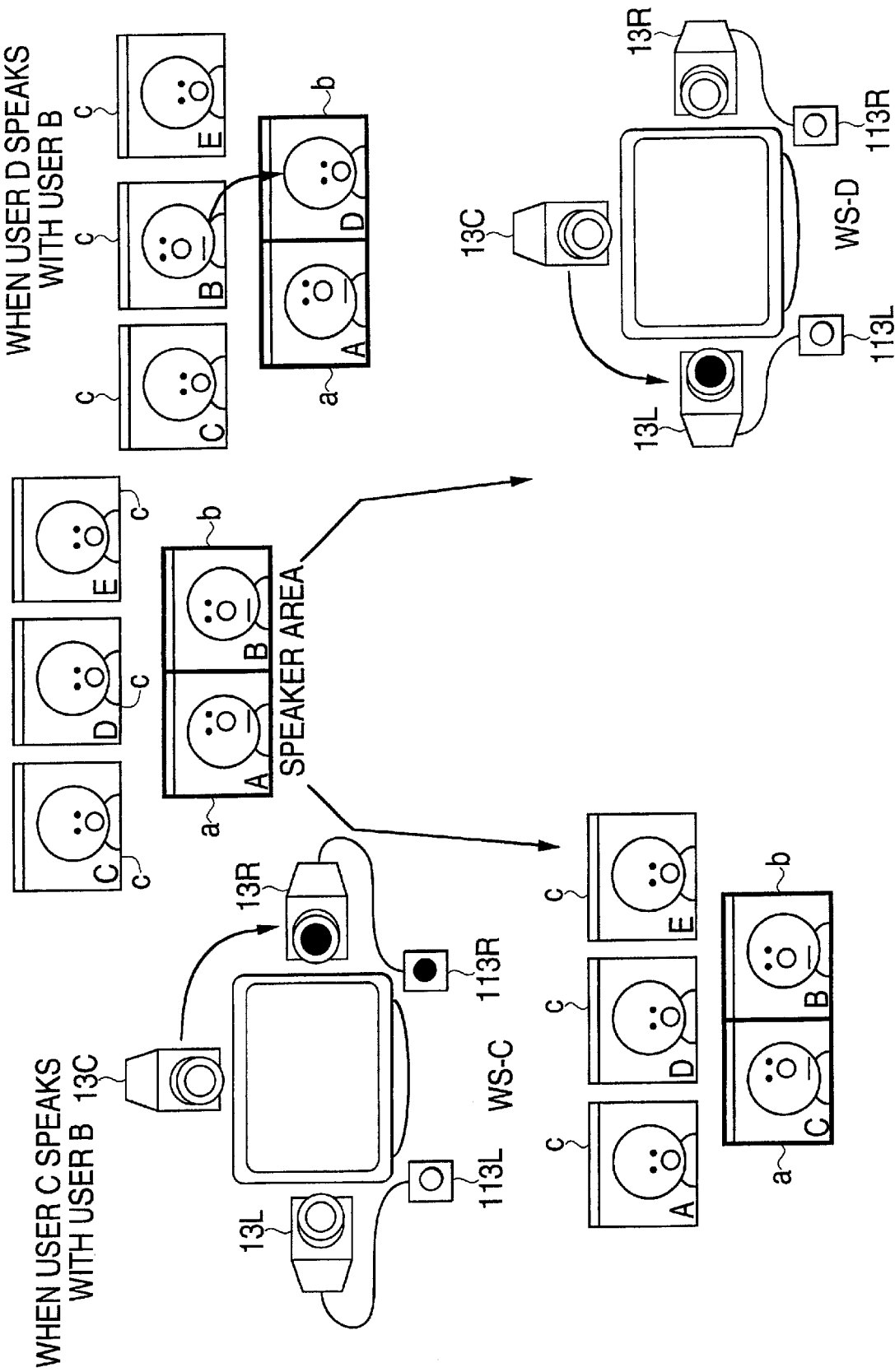

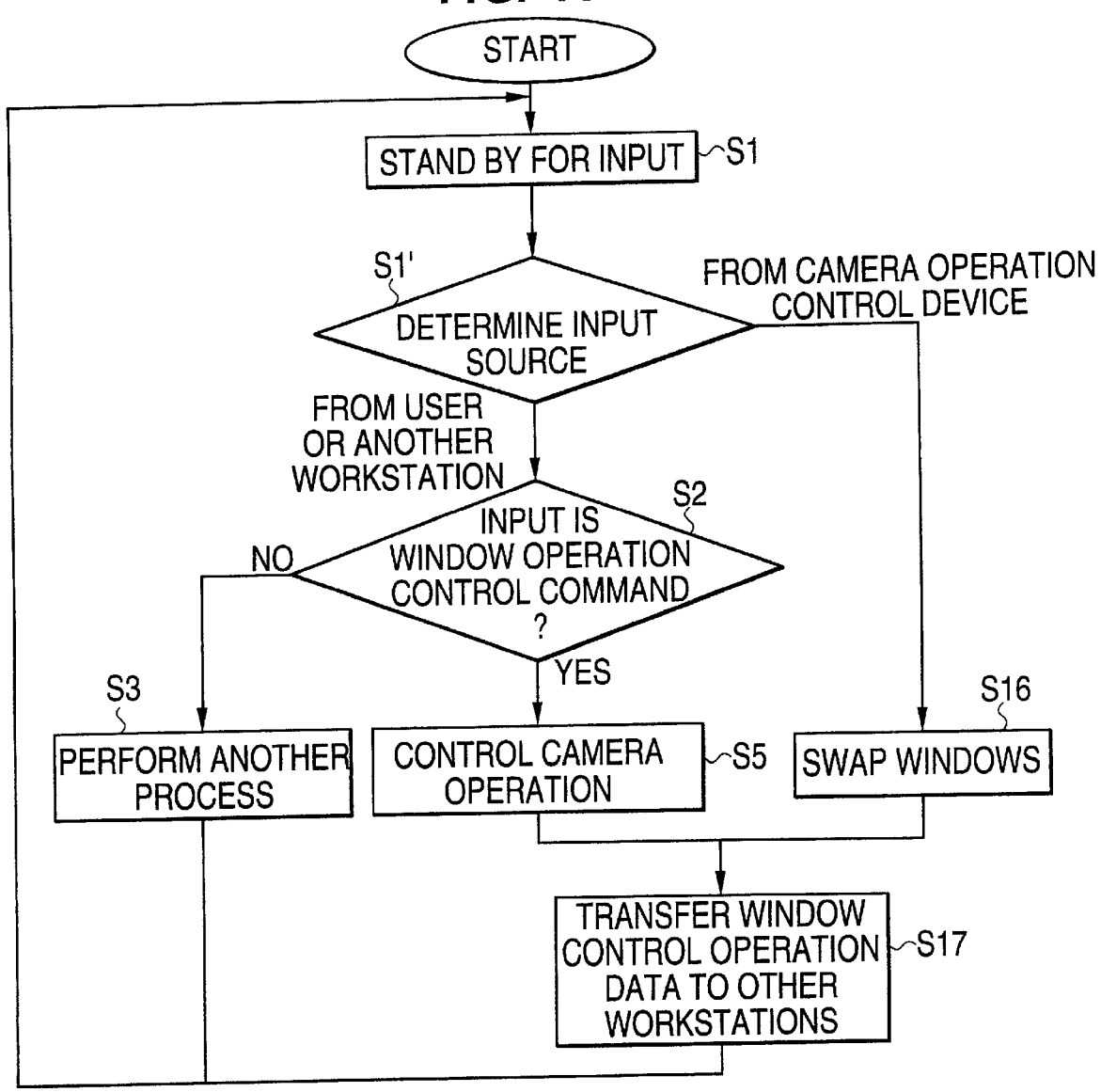

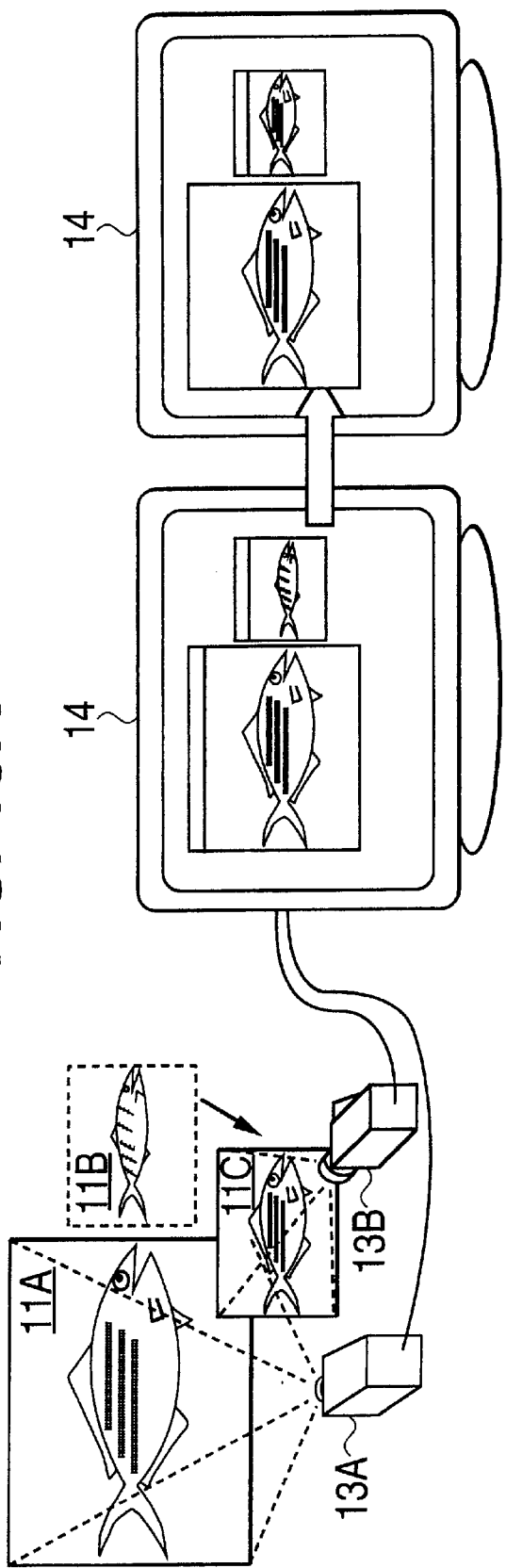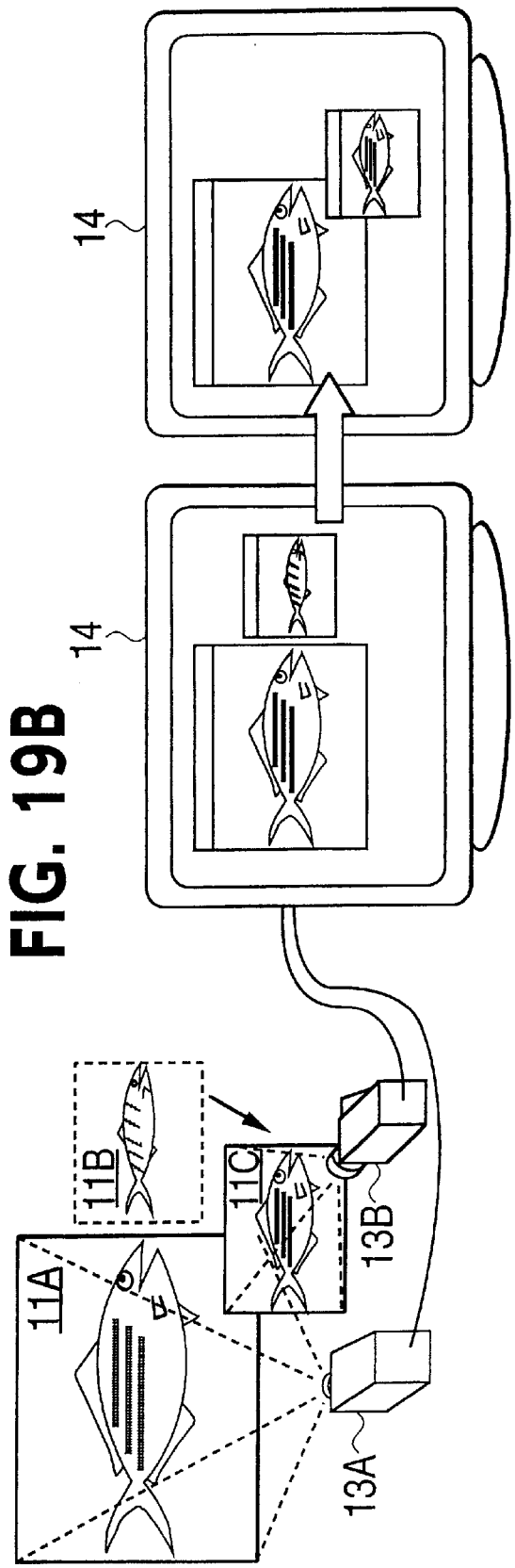

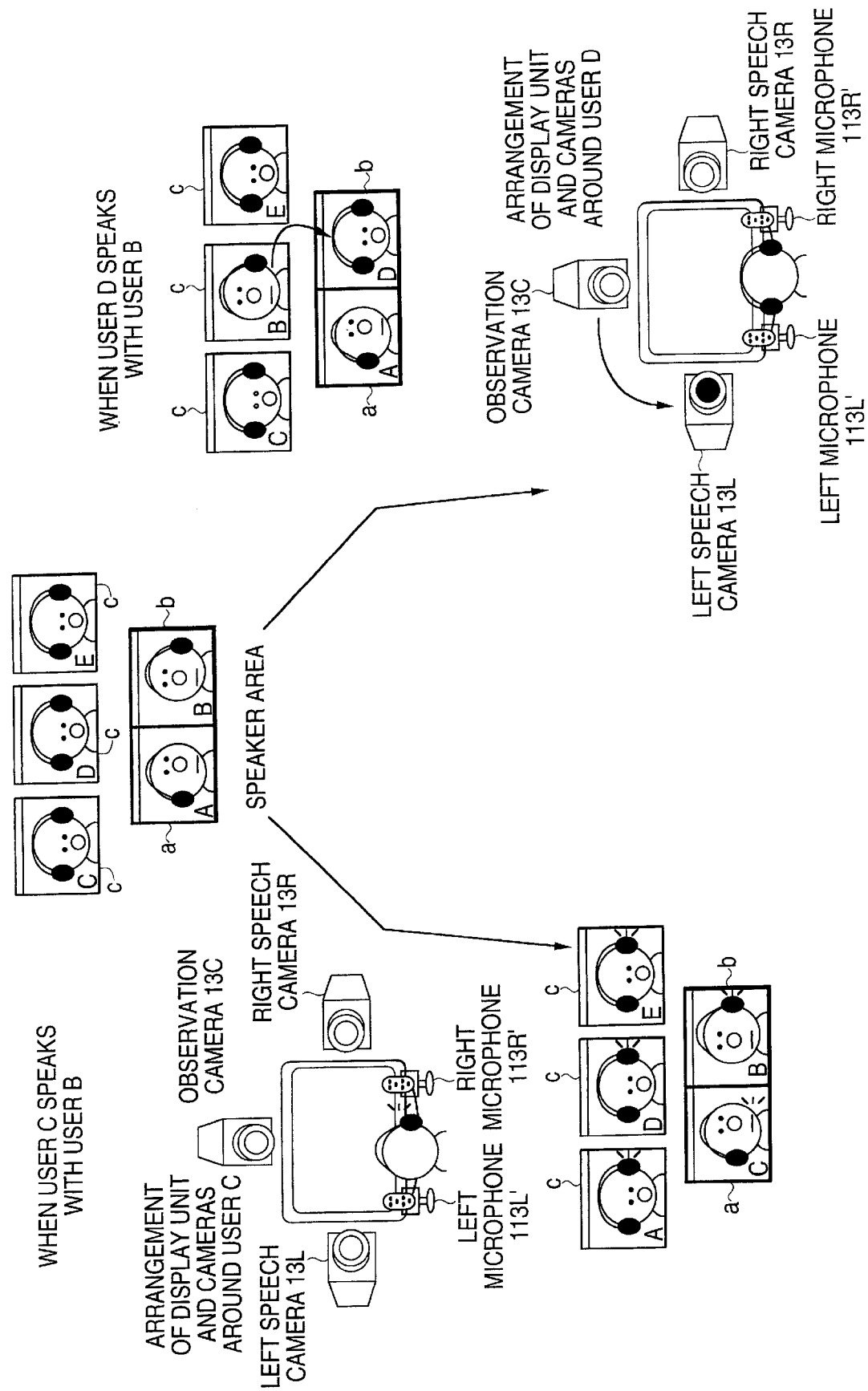

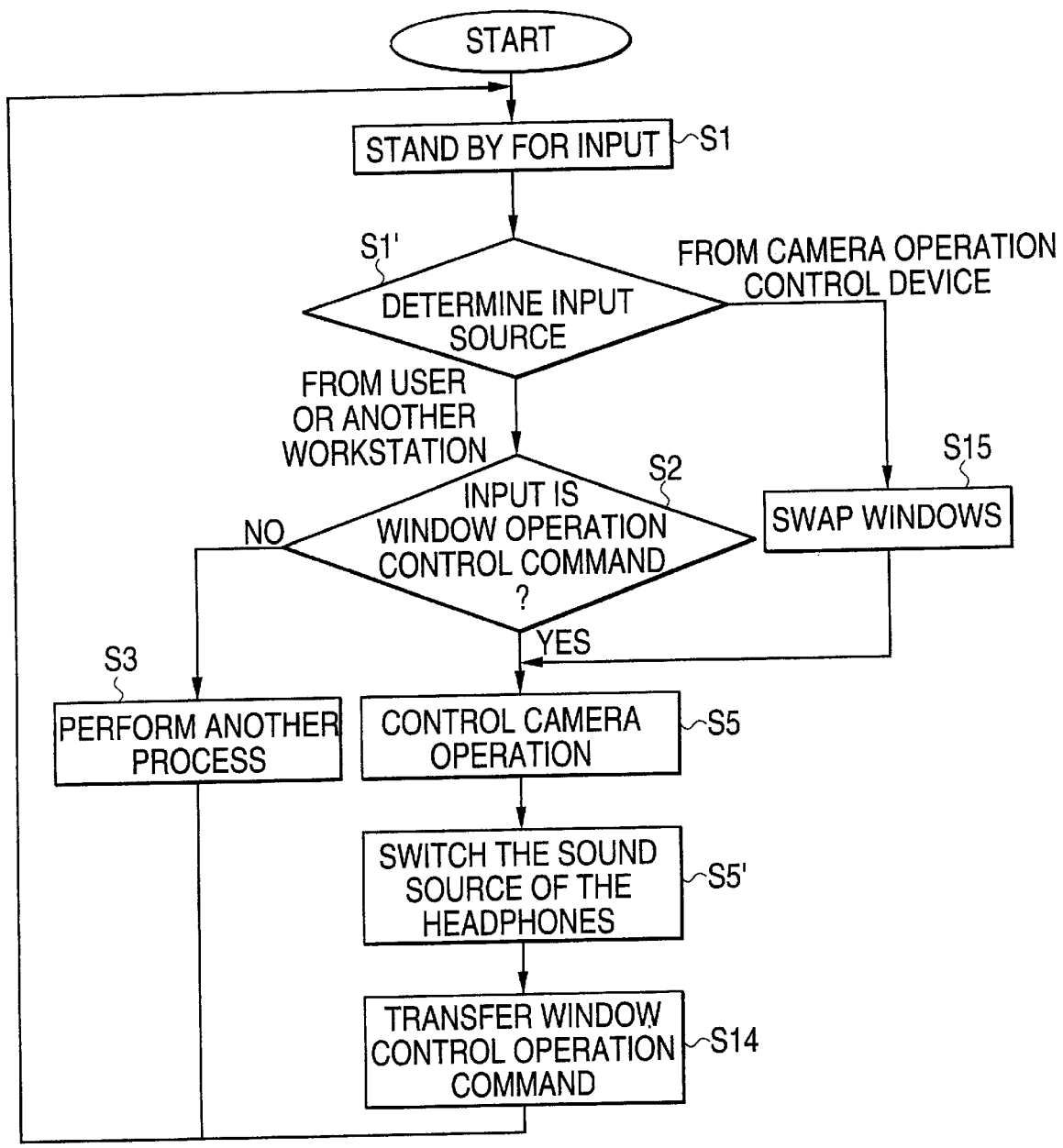

APPARATUS AND METHOD FOR CAMERA CONTROL

This application is a continuation of Ser. No. 08/438,061 filed May 8, 1995.

BACKGROUND OF THE INVENTION

1. Field of the Invention

This invention refers to an apparatus and a method for managing a multi-window system operating with a workstation and a camera controlling device, and more specifically to an apparatus and method for a coordination control between a window and a camera for displaying dynamic and static images captured by the camera on the window by interrelating a camera operation control with a window operation control.

2. Background of the Related Arts

In a conventional apparatus for displaying images captured by a camera on a window of a display unit of a workstation, the window simply displays an image without interlocking information on an image displayed on the window with information of the environment in which the window exists, thereby giving an unnatural impression to a user.

Thus, techniques have been proposed for displaying appropriate image data input from a camera on a window in connection with a scrolling of an image inside of the window and a scaling-up of a window size by controlling an image capturing apparatus according to an instruction for changing the image in the window. (Refer to the Japanese Laid-open Patent Publication No. 3-217978.)

However, such prior arts simply control an image capturing apparatus corresponding to an instruction for changing the image in a single window, and cannot control an inter-relation between multiple windows (multi-windows) or the camera itself by an instruction from a user.

Thus, the prior art has the following disadvantages.
(1) Since the relative positions of images cannot be obtained, users receive an unnatural impression.
(2) When participants are displayed in multi-windows as in a teleconference, since images of faces of the participants are controlled individually in the conventional apparatus, each of the participants cannot control the images so that they can face each other on the display device, and an appropriate display of relationships of the participants cannot be obtained:
(3) Since the relative position of the windows does not change in connection with the change of positions of cameras, the users cannot grasp the relative positions of the objects seen in the windows.
(4) Since the user cannot control the camera directly, the user cannot easily control the camera in a three-dimensional-manner so as to display a forward view, a side view, or a rear view of the object, and cannot easily move the camera from the present position to a different position.

SUMMARY OF THE INVENTION

This invention has been developed to solve the problems of prior arts, and aims to provide an apparatus and method for a coordination control between a window and a camera by which a user can control a camera quite naturally and efficiently and can effectively see an image captured by the camera on a display unit of a computer.

This invention also aims to provide an apparatus and method for a coordination control between each window of multi-windows and cameras capable of showing relative image positions of objects and their inter-relations without giving an unnatural impression.

This invention also aims to provide an apparatus and method for a coordination control between a window and a camera which allow a user to freely select the range of an image displayed on the window by the user directly controlling the camera.

An apparatus for a coordination control between a window and a camera according to this invention comprises; a window control unit for controlling the window according to a window operation command issued by a user; an information conversion unit for converting information on a position of the window in a display and/or information on a size of the window into camera control information; and a camera control unit for controlling an on/off status (switching between on-state and off-state) of the camera, a position of the camera, a shooting distance of the camera, a direction (a shooting direction) of the camera, and/or a zoom setting of the camera, based on the camera control information.

Another apparatus for a coordination control between a window and a camera according to this invention comprises a camera control unit for controlling the camera according to a camera operation command issued by a user; an information conversion unit for converting information on an on/off status (switching between on-state and off-state) of the camera, a position of the camera, a shooting distance of the camera, a direction (a shooting direction) of the camera, and/or a zoom setting of the camera, into window control information; and a window control unit for controlling a position of the window and/or a size of the window based on the window control information.

The window control unit may also control the window according to a window operation command issued by a user, the information conversion unit may also convert information on the window supplied from the window control unit into camera control information, and the camera control unit may also control the camera based on the camera control information.

The information conversion unit may convert information on a position of the window into the camera control information and the camera control unit may control at least one of a change of a position of the camera and a change of a direction of the camera based on the camera control information.

The information conversion unit may convert information on a size of the window into the camera control information and the camera control unit may control a zoom of the camera based on the camera control information.

The information conversion unit may also convert a relative position of the window to another window on the display into the camera control information, and the on/off status, the position, the direction, and/or the zoom setting of the camera, may be controlled based on the camera control information. Further, an on/off status, a position, a direction, and/or a zoom setting of another camera, which provides images to another window on the display, may be controlled based on the camera control information.

The information conversion unit may also convert sound information supplied by a user into the camera control information, and the camera may be controlled based on the sound information.

The information conversion unit may convert information on a zoom setting of the camera into the window control information, and the window control unit may control a size of the window based on the window control information.

The information conversion unit may convert information on a direction of the camera into the window control information, and the window control unit may control a position of the window based on the window control information.

The information conversion unit may convert information on an on/off status of the camera into the window control information, and the window control unit may control a position of the window based on the window control information.

The information conversion unit may convert sound information provided by a user into the window control information, and a position of the window may by controlled based on the window control information.

A method for a coordination control between a window screen and a camera according to this invention includes a step of controlling the window according to a window operation command issued by a user; a step of converting information on the control of the window into camera control information; and a step of controlling the camera based on the camera control information.

Another method for a coordination control between a window screen and a camera according to this invention includes a step of controlling the camera according to a camera operation command issued by a user, a step of converting information on the control of the camera into window control information; and a step of controlling the window based on the window control information.

Another method for a coordination control between a window screen and a camera according to this invention includes a step of controlling the window according to a window operation command issued by a user; a step of converting information on the control of the window into camera control information; a step of controlling the camera based on the camera control information; a step of controlling the camera according to a camera operation command issued by a user; a step of converting information on the control of the camera into window control information; and a step of controlling the window based on the window control information.

In the methods, the window and/or the camera may be also controlled by sound information supplied by a user.

BRIEF DESCRIPTION OF THE DRAWINGS

One of an ordinary skill in the art may easily understand additional features and objects of this invention from the description of the preferred embodiments and the attached drawings.

In the drawings:

FIG. 1 is a block diagram illustrating the global configuration of a first embodiment of this invention;

FIG. 2 is a flowchart illustrating processes of the first embodiment;

FIGS. 3A and 3B show a control of a camera according to a position of a window;

FIGS. 4A and 4B show a control of a camera according to a size of a window;

FIG. 5 is a block diagram illustrating the global configuration of a second embodiment of this invention;

FIG. 6 is a flowchart illustrating processes of the second embodiment;

FIG. 7 is a block diagram illustrating the global configuration of a third embodiment of this invention;

FIG. 8 is a flowchart illustrating processes of the third embodiment;

FIG. 9A through 9G show a control of positions of a camera according to positions of a window;

FIG. 16 is an explanatory diagram illustrating operations of the sixth embodiment;

FIG. 17 is a flowchart illustrating processes of the sixth embodiment;

FIGS. 19A and 19B are explanatory diagrams illustrating an eighth embodiment of this invention;

FIG. 20 is an explanatory diagram illustrating a ninth embodiment of this invention; and FIG. 21 is a flowchart illustrating processes of the ninth embodiment.

DESCRIPTION OF THE PREFERRED EMBODIMENTS

Figure 9G:
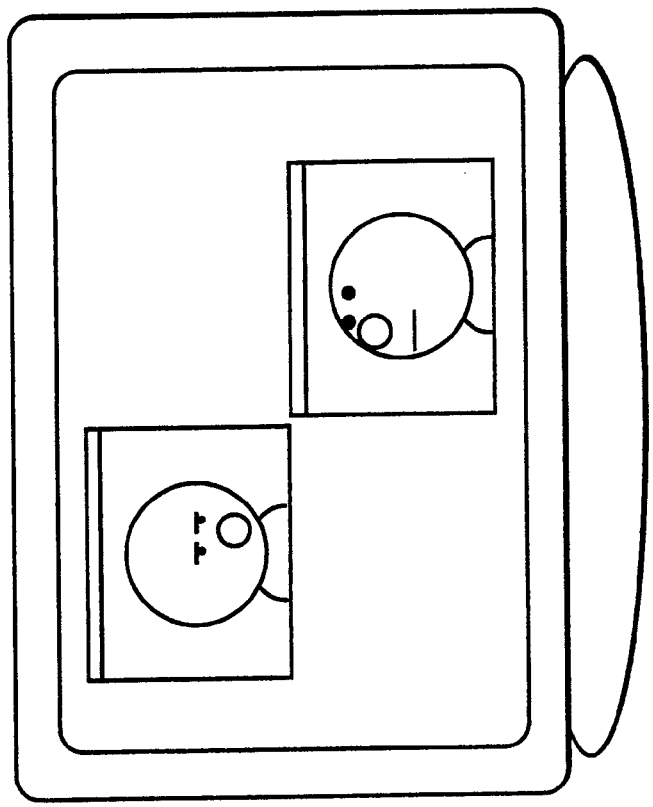

Described below with reference to drawings are concrete embodiments of this invention. Parts shown in a drawing which are the same as those shown in another drawing have the same reference numbers, thereby saving the repetition of their explanations.

First Embodiment

FIG. 1 is a block diagram illustrating the global configuration of an apparatus for a coordination control between a window and a camera according to a first embodiment of this invention. As shown in FIG. 1, the apparatus displays images captured by the camera 13 in a window 19 of multiple window screens on the display device 14. In the apparatus, information (data) on a position on a display device 14 and information on a size of the window 19 are used for determining an on/off status (on-state or off-state), a position, a direction, and a zoom of the camera. In FIG. 1, numerals 11, 12, and 13 denote a viewed object such as a person, a user operating the terminal or the window, and the camera, respectively. The camera 13 comprises a camera control device 16, which controls the on/off status, the position, the direction, and the zoom of the camera 13.

The display device 14 displays the viewed object 11 captured by the camera 13 in the window 19. An display control device 15 of this embodiment displays images captured by the camera 13 in the window 19 using information (or data) on the position and the size of the window provided from a window control unit 18. An information conversion unit 17 of this embodiment converts information on the position and the size of the window provided from a window control unit 18 into camera control information, including information on the on/off status, the position, the direction, and the zoom setting of the camera.

The window control unit 18 controls the window 19 or the multi-windows on the display device 14 according to a window operation command issued by the user 12.

FIG. 2 is a flowchart illustrating processes of the first embodiment.

A computer (workstation) waits for an input into the window control unit 18 from the user 12 (Step S1), determines whether or not the input is the window operation command (Step S2), and performs another process according to the input when the input is not the window operation command (Step S3).

When the input is the window operation command, the window control unit 18 sends the information on the position of the window 19 and the information on the size-of the window 19 to the display control device 15, revises (moves, resizes, etc.) windows 19, and provides the information on the position and the size of the window to the information conversion unit 17.

The information conversion unit 17 converts the information on the position and the size of the window 19 into camera control information including the information on the position, the direction, and the zoom setting of the camera 13, and supplies the camera control information to the camera control device 16 (Step S4). The camera control device 16 controls the camera 13 based on the camera control information (Step S5), and in parallel with the above processes, the display control device 15 continues displaying the image captured by the camera 13 on the display device 14, based on the information on the position and the size of the window 19 sent from the window control unit 18.

FIG. 3A is a first one of explanatory diagrams illustrating in a two-part series a displayed image, where a camera direction is unrelated to an on-screen window position.

When the camera direction is controlled independently of the on-screen window position, since an image in the window moves as the window displaying the image captured by the camera is moved, the image shown on the display device does not change.

FIG. 3B is a second one of explanatory diagrams illustrating in a two-part series a displayed image, where a camera direction is interrelated with an on-screen window position.

As shown in FIG. 3B, when the camera control device 16 controls the camera direction corresponding to the on-screen window position, since the image in the window 19 changes corresponding to the on-screen window position, the user can chose the view on the display device 14 and can get a natural impression as if the total image is fixed in the display device and the user is watching part of the image by moving a viewing window.

FIG. 4A is a first one of explanatory diagrams illustrating in a two-part series a displayed image, where a camera zoom setting is unrelated to an on-screen window size.

As shown in FIG. 4A, when the camera zoom setting is controlled independently of an on-screen window size, since the image in the window is enlarged or reduced as the window is enlarged or reduced, the boundary of the image does not change.

FIG. 4B is a second one of explanatory diagrams illustrating in a two-part series a displayed image, where a camera zoom setting is interrelated with an on-screen window size.

As shown in FIG. 4B, when the camera control device 16 controls the camera zoom setting corresponding to an on-screen window size, since the boundary of the image in the window 19 changes corresponding to the on-screen window size, the user can chose the boundary of the view on the display device 14 and can get the natural impression as if the total image is fixed in the display device 14 and the user is observing part of the image by resizing a viewing window.

This embodiment may have not only the functions shown in FIG. 3B and FIG. 4B but also the functions shown in FIG. 3A and FIG. 4A.

Second Embodiment

FIG. 5 is a block diagram illustrating the global configuration of an apparatus for a coordination control between a window and a camera according to a second embodiment of this invention. As shown in FIG. 5, the position and the size on the display device 14 of the window 19 is controlled using the camera information, including information on the on/off status, the position, the direction,and the zoom setting of the camera 13.

The camera 13 comprises a camera control device 26 which controls the on/off status, the position, the direction, and the zoom setting of the camera 13 based on a camera operation control command provided by the user 12. The camera 13 captures the image of the object 11 and the display control device 15 displays the image in the window 19 of the display device 14 using the window information, including information on the position and the size of the window 19.

An information conversion unit 27 converts camera information including information on the on/off status, the position, the direction, and the zoom setting of the camera 13 supplied from the camera control device 26 into window control information, including information on the position and size of the window 19 on the display device 19. A window control unit 28 controls window 19 on the display device 14 based on the window control information supplied from the information conversion unit 27.

FIG. 6 is a flowchart illustrating processes of the second embodiment. A computer (workstation) waits an input to the camera control device 26 from the user 12 (step S11). If the input is the camera operation command, the camera operation command is sent to the camera control device 26 and the camera control device 26 controls the camera 13 according to the camera operation command. Then, the camera control device outputs camera information on the on/off status, position, direction, and zoom setting of the camera 13 to the information conversion unit 27, and the information conversion unit 27 converts the camera information into camera control information, which is sent to the window control unit 28 (Step S12). The window control unit 28 controls the window 19 based on the window control information (Step S13).

In the meantime, in parallel with the above processes, the display control device 15 controls the display device 14 and displays the image captured by the camera 13 on a position designated by the window control unit 28 with a specified window size.

In this embodiment, since the user 12 can directly operate the camera 13, and the corresponding window 19 is controlled according to the camera information, the user 12 can select the viewed object by observing the window 19. For example, the user 12 can easily get the forward view, side view and rear view of the object 11, and can easily move the camera 13 from the present position to a position far from the present position to view a new object.

Third Embodiment

FIG. 7 is a block diagram illustrating the global configuration of an apparatus for a coordination control between a window and a camera according to a third embodiment of this invention.

The third embodiment is a combination of the first embodiment and the second embodiment, and operates in both directions between a camera operation control and a window operation control.

As shown in FIG. 7, in this embodiment, a camera control device 36 controls the on/off status, the position, the direction, and the zoom setting of the camera 13 according to the camera operation command provided by the user 12, and the camera control information from an information conversion unit 37. A window control unit 38 controls the position and the size of the window 19 according to the window operation command provided by the user 12 and the window control information from the information conversion unit 37.

The information conversion unit 37 converts the window information, including information on the position and the size of the window 19, into the camera control information for sending to the camera control device 36, and also converts the camera information including information on the on/off status, the position, the direction, and the zoom setting of the camera 13 into the window control information for sending to the window control unit 38.

FIG. 8 is a flowchart illustrating processes of the third embodiment.

A computer (workstation) waits an input from the user 12 or the camera control device 36 (Step S1), and determines the source of the input (Step S1'). When the input is from the user, the computer performs Step 2 through Step 5 as described in the first embodiment. When the input is from the camera control device 36, the computer performs Step 12 and Step 13 as described in the second embodiment.

In the meantime, in parallel with the above processes, the display control device 15 displays the image captured by the camera 13 on a portion of the display device 14 designated by the window control unit 38 with the specified window size.

According to a method of this invention, the camera 13 is controlled based on the window information, which can be controlled by the user 12 based on the window operation command, and/or the camera operation command input by the user 12. Therefore, the window information and the camera information are interrelated for displaying the image in the window 19, and the user 12 can get an effective image from the display device 14. Further, the user can visualize the interrelations and relative positions between objects shown in different windows on the same display device 14 and can get a natural impression. Especially, when the system is used in a teleconference, the participant can face another member who the participant wants to talk to on the display device, and their faces can be naturally directed toward each other on the display device.

According to the apparatus of this invention, the window 19 can be regarded as a user interface for controlling the camera 13, and the user 12 can control the camera 13 quite naturally and effectively for presentation of an image. Further, the user can visualize the interrelations and relative positions between objects shown in different windows on the same display device 14, and can get a natural impression.

In addition, the user 12 can directly control the camera 13 and freely select the scope of the image displayed in the window 19. The apparatus is effective in maintaining the relative on-screen sizes or on-screen positions of the objects presented in different windows on the same display device.

The above described embodiments are essential configurations of this invention and applications of these configurations will be described below.

Explained first using FIG. 9A through FIG. 9G is a control of a camera position by the relative on-screen window positions of windows (a control of the camera based on window information).

It is important for a teleconference system in a remote distribution system to appropriately present the faces of participants in windows.

Usually, the teleconference system presents only front views of the participants so that the user faces the participants, as shown FIG. 9A.

However, since the camera cannot be placed directly in front of the face of the user due to the existence of a display unit, a devise for obtaining a strict front view of the face, such as a half-mirror, is needed.

Window screens displaying the faces of both a user and another participant present a natural impression even if the participant in the image does not actually look at the user on the display device, as shown in FIG. 9B. In this method, the camera need not be placed directly in front of the face for capturing a front view, instead the camera can be placed beside the display device.

For presenting a better natural impression, the relative on-screen window positions between the windows showing the user and a participant to be talked to, and the directions of the faces of the user and the participant, are important. For example, it gives an unnatural impression when the participants do not face each other on the display device, even though the windows are placed side by side on the display device, as shown in FIG. 9C and FIG. 9D. The faces of the participants should be captured so that the eyes of the participants meet on the display device, as shown in FIG. 9E.

Figure 9F:
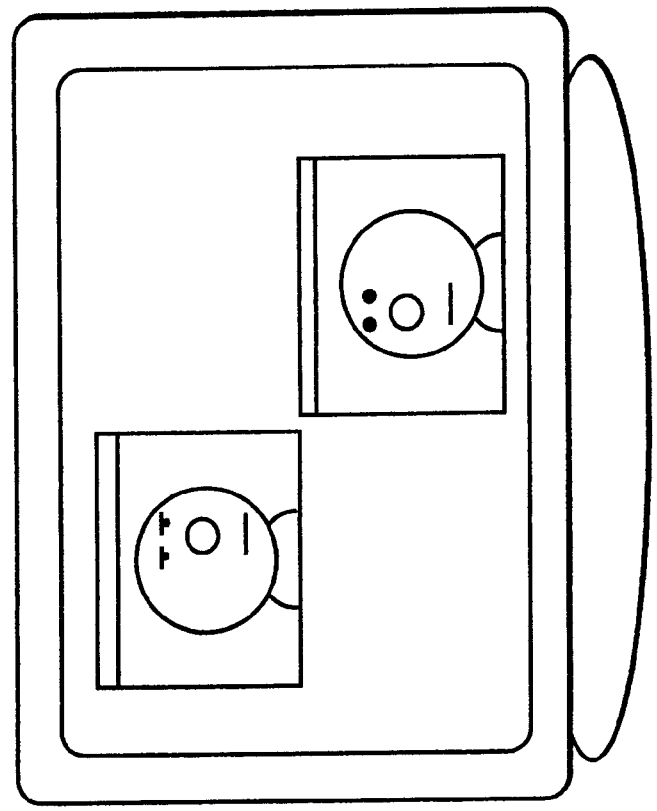

FIG. 9F shows an example presenting an unnatural impression, in which the eyes of the participants do not meet on the display device because the windows are not placed side by side on the display device. The faces of the participants should be captured and displayed so as to face each other, as shown in FIG. 9G.

It can generally be assumed that the user or another participant is facing the display device while operating their computers. However, a change of camera positions allows images to be captured from various directions, even if the user constantly faces the display device. The camera operation control of either the camera position or the camera direction, according to the relative on-screen window positions of the window showing the face of the user and the window showing the face of another participant, enables the camera to constantly capture an appropriate image, thereby presenting a natural impression.

Fourth Embodiment

Described below is a fourth embodiment of this invention. In the description of the fourth embodiment, a system according to this invention for a coordination control between a window and a camera is used in a teleconference in which two people in different locations have a dialog.

Figure 10:
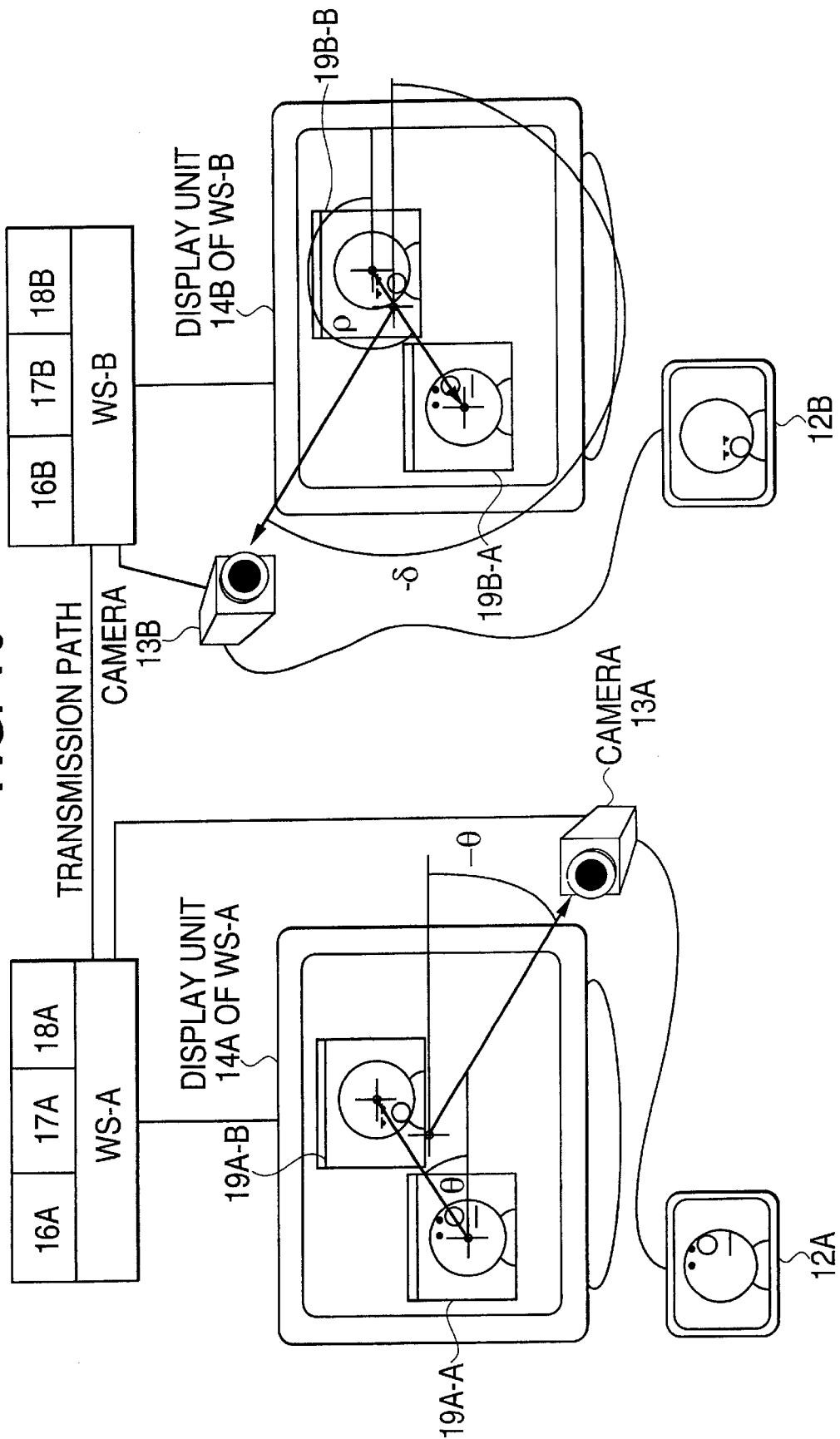
FIG. 10 is a block diagram illustrating the global configuration of a fourth embodiment of this invention.

FIG. 10 is a block diagram illustrating a global configuration of the system. This system uses two computers (workstations) shown in FIG. 1 and each of the cameras of the workstations captures a image of the corresponding user.

Camera 13A captures image of user 12A of a workstation WS-A, and camera 13B capture image of user 12B of workstation WS-B. The workstations WS-A and WS-B are connected to each other via a transmission path. The workstations WS-A and WS-B respectively comprise display devices 14A and 14B, and the display devices 14A and 14B respectively comprise a pair of windows 19A-A and 19A-B, and 19B-A and 19B-B. The window 19A-A and the window 19B-A display the image captured by the camera 13A, and the window 19A-B and the window 19B-B display the image captured by the camera 13B.

In the fourth embodiment, because each of the users 12A and 12B has only one of the cameras 13A and 13B, respectively, windows 19A-A and 19B-A show the same image of user 12A, and windows 19A-B and 19B-B show the same image of user 12B. Thus, both of the windows 19A-A and 19A-B in the display device 14A and windows 19B-A and 19B-B in the display device 14B must be positioned in the same relationship to each other.

In this embodiment, when one of the users 12A or 12B moves one of his windows, the corresponding one of camera control devices 16A or 16B changes the camera position of the corresponding one of the cameras 13A or 13B, and the other one of the window control units 18A or 18B also changes the window position of the other one of the pairs of windows.

Figure 11:
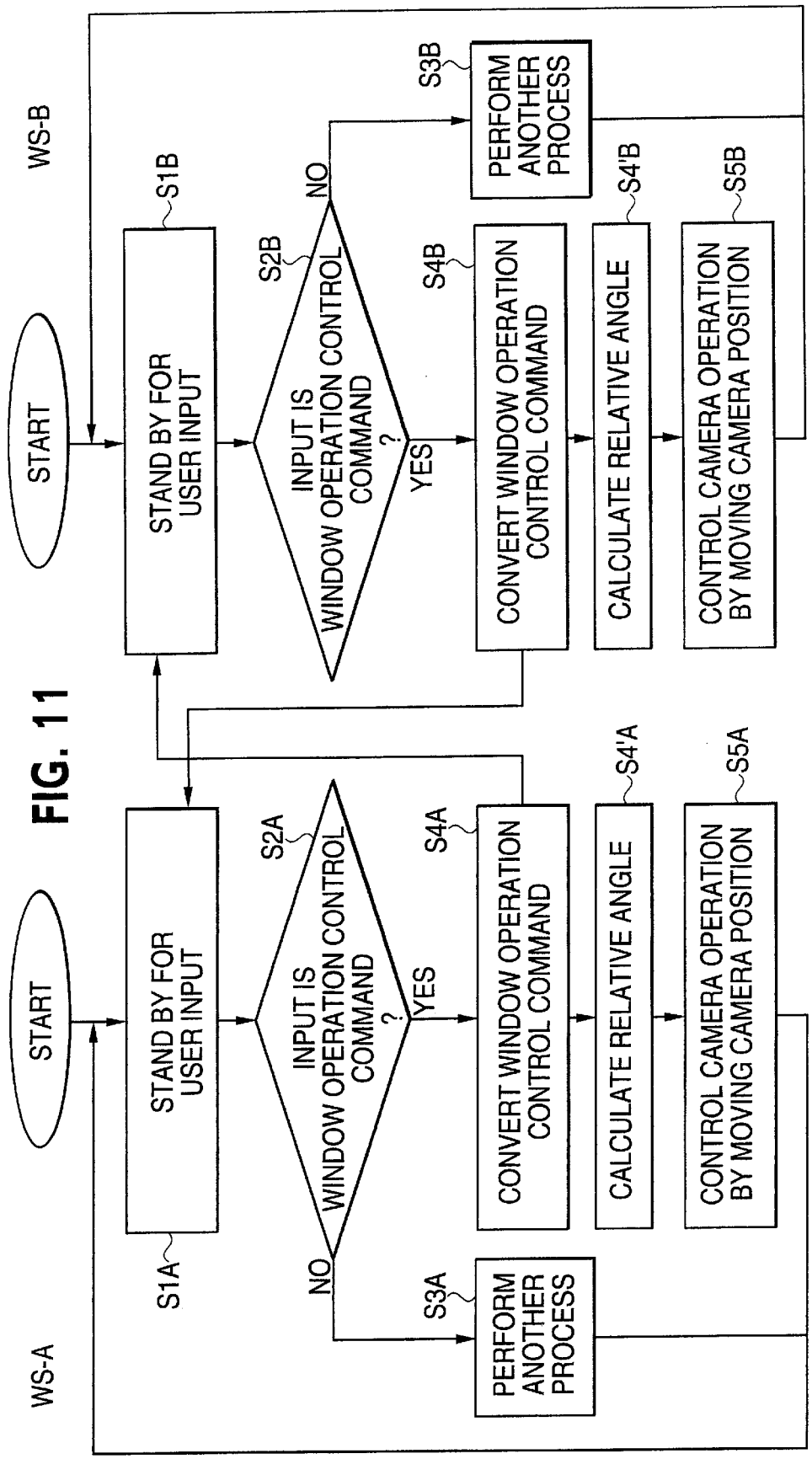
FIG. 11 is a flowchart illustrating processes of the fourth embodiment.

FIG. 11 is a flowchart illustrating processes of the fourth embodiment, and described below with reference to FIG. 11 are processes of the fourth embodiment.

Steps with a large letter "A" after a numerical step number indicate those for workstation WS-A, and steps with a large letter "B" after a numerical step number indicate those for workstation WS-B, where the same numerical step numbers indicate basically identical processes.

Each of the workstations WS-A and WS-B (computers A and B) stands by for an input to the corresponding window control units from the corresponding users or from the other workstation (Steps S1A and S1B), and determines whether or not the input is the window operation command (Steps S2A and S2B). When the input is not the window operation command, the workstations WS-A and WS-B perform another process according to the input (Steps S3A and S3B).

When the input is the window operation command, the corresponding one of the window control units 18A and 18B transfers the window operation command to the other one of the window control units 18A and 18B, thereby sending window control information on an on-screen window position and an on-screen window size to both of the display control devices 15A and 15B, for a strictly interlocked control of the workstations WS-A and WS-B.

Each of the window control units 18A and 18B revises (moves, resizes, etc.) the corresponding pairs of the windows 19A-A and 19A-B and windows 19B-A and 19B-B, and provides to the corresponding one of the information conversion units 17A and 17B the window control information on an on-screen window position and an on-screen window size, respectively.

Each of the information conversion units 17A and 17B converts the window control information into camera control information on a camera activation and deactivation (on/off status of the camera), a camera position, a camera direction, a camera zoom setting and so forth, and supplies them to the corresponding one of the camera control devices 16A and 16B (Steps S4A and S4B).

Further, each of the information conversion units 17A and 17B calculates a relative on-screen window angle $\theta$ of window 19A-B against window 19A-A and a relative on-screen window angle $\delta$ of window 19B-B against window 19B-A, respectively, where $\delta=\theta\pm\pi$ (Steps S4'A and S4'B).

Each of the camera control devices 16A and 16B controls the corresponding one of the cameras 13A and 13B by moving its position by the corresponding one of angles $-\theta$ and $-\delta$, based on the camera control information calculated in steps S4'A and S4'B, respectively (Steps S5A and S5B).

In the meantime, in parallel with the above processes, each of the display control devices 15A and 15B continues having the corresponding one of the display devices 14A and 14B display each image captured by either one of the cameras 13A and 13B, based on the window control information.

Returning to FIG. 10, the processes shown in FIG. 11 are explained by using a specific example.

When user 12A of workstation WS-A instructs window control unit 18A to move the window position of window 19A-A, information conversion unit 17A calculates an angle $\theta$, which is defined as an angle between a straight line drawn from the center of window to 19A-A to the center of window 19A-B, and a horizontal line through the center-line of displays 14, and camera control device 16A moves the camera position of camera 13A by $-\theta$.

Then, upon receipt of window control information from window control unit 18A, window-control unit 18B moves the window position of window 19B-A, information conversion unit 17B calculates an angle $\delta$, which is defined as an angle between a straight line drawn from the center of window 19B-A to the center of window 19B-B, and a horizontal line through the center-line of displays 14, and camera control device 16B moves the camera position of camera 13B by $-\delta$.

This equalizes the relative on-screen window positions between windows 19A-A and 19A-B with those between windows 19B-A and 19B-B, and the users 12A and 12B can face each other on both display devices, thereby presenting a natural impression to both the users 12A and 12B.

Fifth Embodiment

Explained below is a fifth embodiment of this invention in which workstations control a plurality of fixed cameras on the basis of window control information on relative on-screen window positions.

Under circumstances similar to those of the fourth embodiment, it is possible to display an appropriate image by switching an activation and a deactivation (on/off status) of the cameras positioned at several locations according to the relative on-screen window positions, instead of physically moving one camera.

Figure 12:
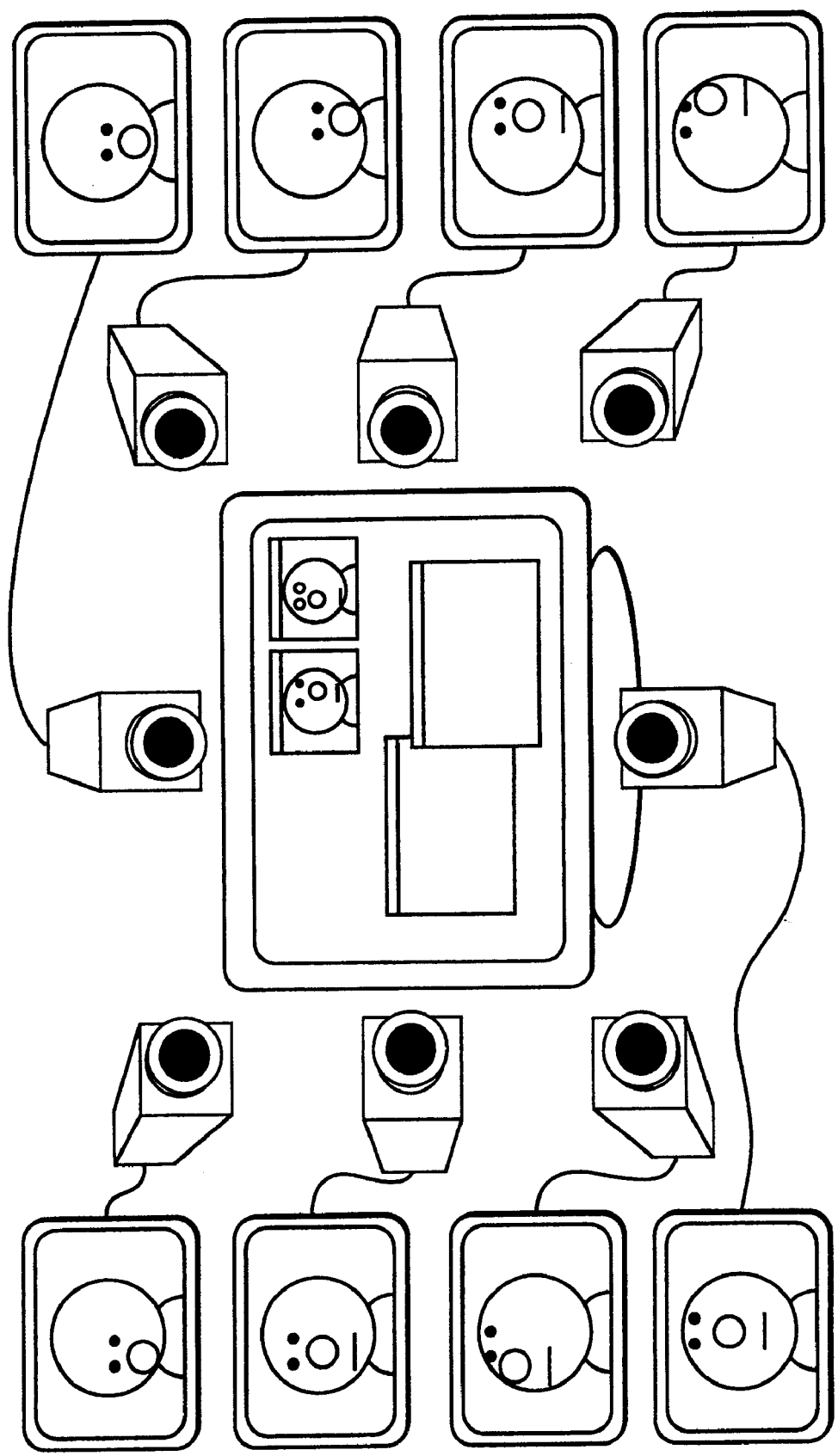
FIG. 12 is an explanatory diagram illustrating user images captured by a plurality of cameras.

FIG. 12 is an explanatory diagram illustrating user images captured by a plurality of cameras. A plurality of cameras capture images of the faces of the users from various directions. In this case, although the cameras cannot always catch the ideal direction of the faces of the users, it is not necessary to physically move cameras or to control manipulators.

Figure 13:
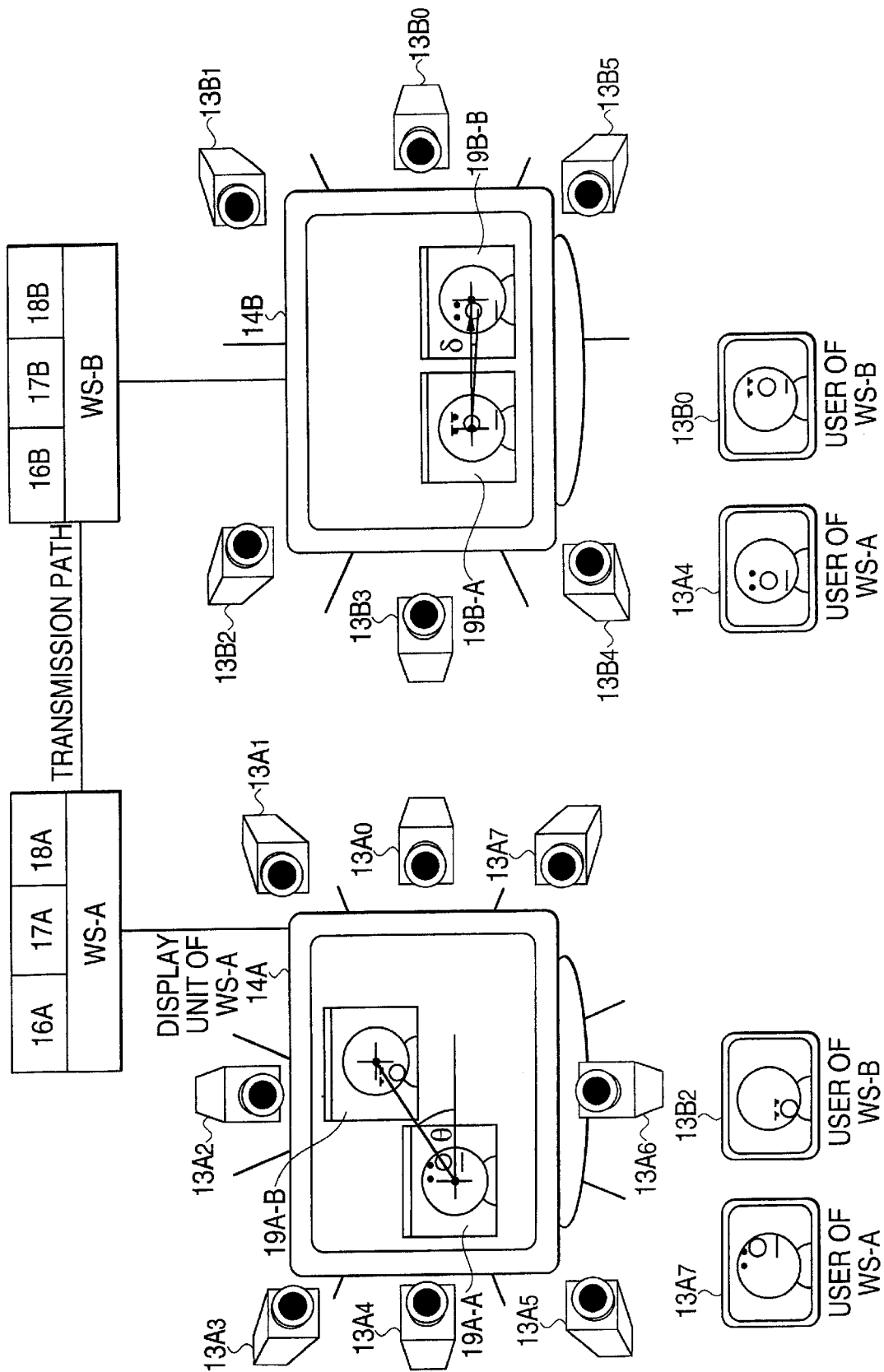
FIG. 13 is a block diagram illustrating the global configuration of a fifth embodiment of this invention.

FIG. 13 is a block diagram illustrating the global configuration of an apparatus for a coordination control between a window and a camera according to a fifth embodiment of this invention.

More specifically, FIG. 13 shows a configuration allowing two people to have a dialog, each person having a computer (workstation) as shown in FIG. 1, and a plurality of cameras to capture his images. In this case, workstation WS-A has eight cameras connected and workstation WS-B has six cameras connected for capturing respective user's images.

Group of cameras 13A0 through 13A7 and group of cameras 13B0 through 13B5 capture images of users 12A and 12B, respectively, and the respective workstations WS-A and WS-B are connected to each other via a transmission path. The workstations WS-A and WS-B respectively comprise display devices 14A and 14B, and have a pair of windows 19A-A and 19A-B and a pair of windows 19B-A and 19B-B displaying images respectively captured by the group of cameras 13A0 through 13A7 and the group of cameras 13B0 through 13B5.

In the fifth embodiment, because each of the faces of the users 12A and 12B are captured by a plurality of the cameras, windows 19A-A and 19B-A of the respective display devices 14A and 14B do not have to show the same image of user 12A, and windows 19A-B and 19B-B of the respective display devices 14A and 14B do not have to show the same image of user 12B. Thus, the display devices 14A and 14B do not have to have their respective pairs of windows 19A-A and 19A-B and windows 19B-A and 19B-B to be positioned in the same relationship.

When one of the users 12A and 12B moves one of his windows, although the corresponding camera control device 16A or 16B changes the camera activation and camera deactivation of the corresponding group of cameras, the other window control unit does not have to forcibly change the window position of the other pair of windows.

Figure 14:
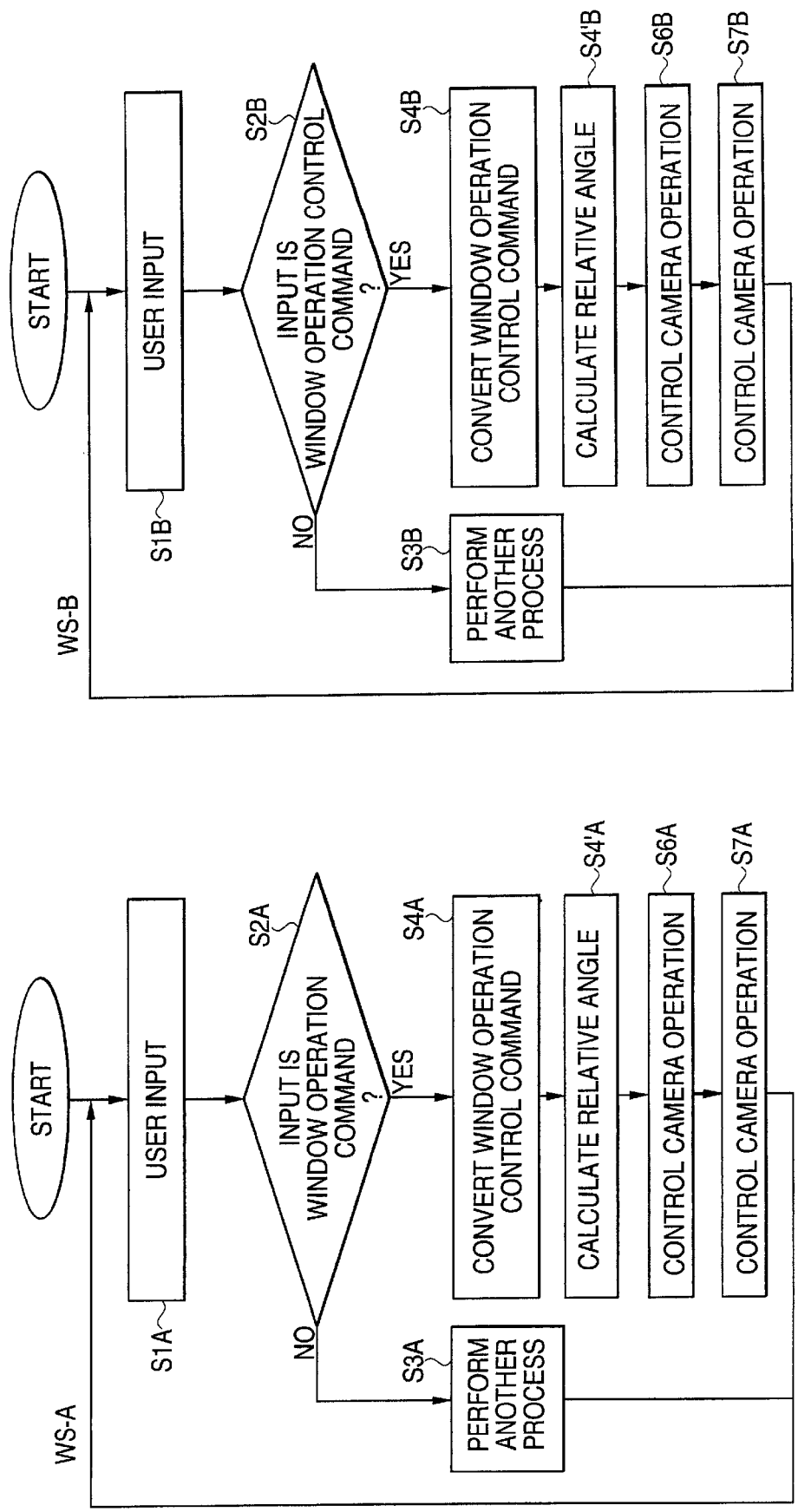
FIG. 14 is a flowchart illustrating processes of the fifth embodiment.

FIG. 14 is a flowchart illustrating processes of this embodiment. Steps with a large letter "A" after a numerical step number indicate those for workstation WS-A and steps with a large letter "B" after a numerical step number indicate those for workstation WS-B, where the same numerical step numbers indicate basically identical processes.

Each of workstations WS-A and WS-B (computers A and B) waits for an input from the users 12A and 12B or from the other workstations WS-A and WS-B (Steps S1A and S1B), and determines whether or not the input is a window operation command (Steps S2A and S2B). When the input is not the window operation command, the workstations WS-A and WS-B perform another process according to the input (Steps S3A and S3B).

When the input is the window operation command, the corresponding window control unit 18 changes the position of the corresponding window on the display device according to the window operation command (Steps S4A and S4B).

Then, the information conversion units 17 of the workstations WS-A and WS-B respectively calculate a relative on-screen window angle e of window 19A-B against window 19A-A, and a relative on-screen window angle 6 of window 19B-B against window 19B-A, respectively, where δ=θ±π (Steps S4'A and S4'B).

The information conversion units 17 of workstations WS-A and WS-B send information on the switching of cameras to the camera control devices 16, respectively.

Then, the camera control devices 16A and 16B activate (or select) one at f(-θ) and one at f(-δ) of group of cameras 13A (comprising 13A0 through 13A7) as cameras capturing images of user 12A to be displayed on windows 19A-A and 19B-A, respectively (Steps S6A and S6B), and all other cameras around the user of workstation WS-A are deactivated.

Further, the camera control devices 16A and 16B activate (or select) one at g(-θ-π) and one at g(-δ-π) of group of cameras 13B (comprising 13B0 through 13B5) as cameras capturing images of user 12B to be displayed on windows 19A-B and 19B-B, respectively (Steps S7A and S7B), and all other cameras around the user of workstation WS-B are deactivated.

In the above steps S6A, S6B, S7A, and S7B, the selection of cameras is performed based on the functions "f" and "g", which are determined according to the window angles θ and α. The functions "f" and "g" provide the number of cameras which will be select as cameras sending images to the windows.

The functions "f" and "g" are defined as follows:

$$f(x) \atop g(x) = \begin{cases} 0 & \text{if} & \beta_0 < x \le \beta_1 \\ 1 & \text{if} & \beta_1 < x \le \beta_2 \\ \vdots & & \\ i & \text{if} & \beta_i < x \le \beta_{(1+i) \bmod m} \\ \vdots & & \\ m-1 & \text{if} & \beta_{m-1} < x \le \beta_0 \end{cases} \quad (1)$$

where
$\alpha = \pi/m$
$\beta_i = (2i-1)\alpha \pm 2n\pi (n=0, 1, \ldots)$

In the definition of function "f" and "g", m is a constant indicating the number of cameras in the group of cameras 13A. The constant m is eight in workstation WS-A and is six in workstation WS-B. It is assumed here that cameras 13A0 through 13A7 in the group of cameras 13A are positioned radially and equidistant around a circle centered on the user of the workstation WS-A. It is also assumed that cameras 13B0 through 13B5 in the group of cameras 13B are positioned radially and equidistant around a circle centered on the user of the workstation WS-B. The cameras 13A0 and 13B0 are positioned on the positive direction of the X axis, which is a horizontal line through the center-line of displays 14.

Yet, cameras do not have to be positioned radially and equidistant around a circle centered on the user, but other positioning of the cameras can be used in this invention.

In the fifth embodiment, the camera control devices of workstations WS-A and WS-B respectively select a camera closest to a θ direction and a camera closest to a -δ direction for capturing the image of the user of the workstation WS-A using the function "f", and also select a camera closest to a -θ-π direction and a camera closest to a-δ-π direction for capturing the image of the user of the workstation WS-B using the function "g".

Returning to FIG. 13, a function of the fifth embodiment will be described in detail below.

When the user 12A moves the window 19A-A so that the relative angle of the window 19A-A and the window 19A-B becomes θ, the camera control device 16A switches a camera activation as follows:

The information conversion unit 17A calculates an angle θ, which is defined as an angle between a straight line drawn from the center of window 19A-A to the center of window 19A-B, against and the to the center of window 19A-B, against and the horizontal line through the center-line of displays 14, and also calculates f(-θ) and g(-θ-π)according to expression (1).

Then, camera control device 16A of workstation WS-A switches a camera activation of the group of cameras 13A and selects a camera at f(-θ). When the window 19A-A is positioned at the lower-left of the window 19A-B as shown in the left figure of FIG. 13, the camera control device 16A of workstation WS-A selects the camera 13A7, which captures an image of user 12A from a position to his lower-right.

The camera control device 16A of workstation WS-A also switches a camera activation of the group of cameras 13B. and selects a camera at g(-θ-π). Accordingly, the camera control device 16A of workstation WS-A selects the camera 13B2, which captures an image of user 12B from a position to his upper-left.

In this case, since the user 12B did not move the window 19B-A nor the window 19B-B, camera control device 16B is not required to switch a camera activation of either group of cameras 13A or group of cameras 13B.

The selection of cameras allows users 12A and 12B to face each other regardless of the window positions in the display devices 14A and 14B, thereby presenting a natural impression of the images.

Sixth Embodiment

Explained below is a sixth embodiment of this invention in which workstations control a plurality of fixed cameras according to relative on-screen window positions. This embodiment performs a bidirectional camera operation control.

In the following description of a sixth embodiment, it is assumed that five people participate in a teleconference. Each person has a workstation having three cameras, two people (speakers) speak at a time, and the other three people (observers) observe their discussion.

Figure 15:
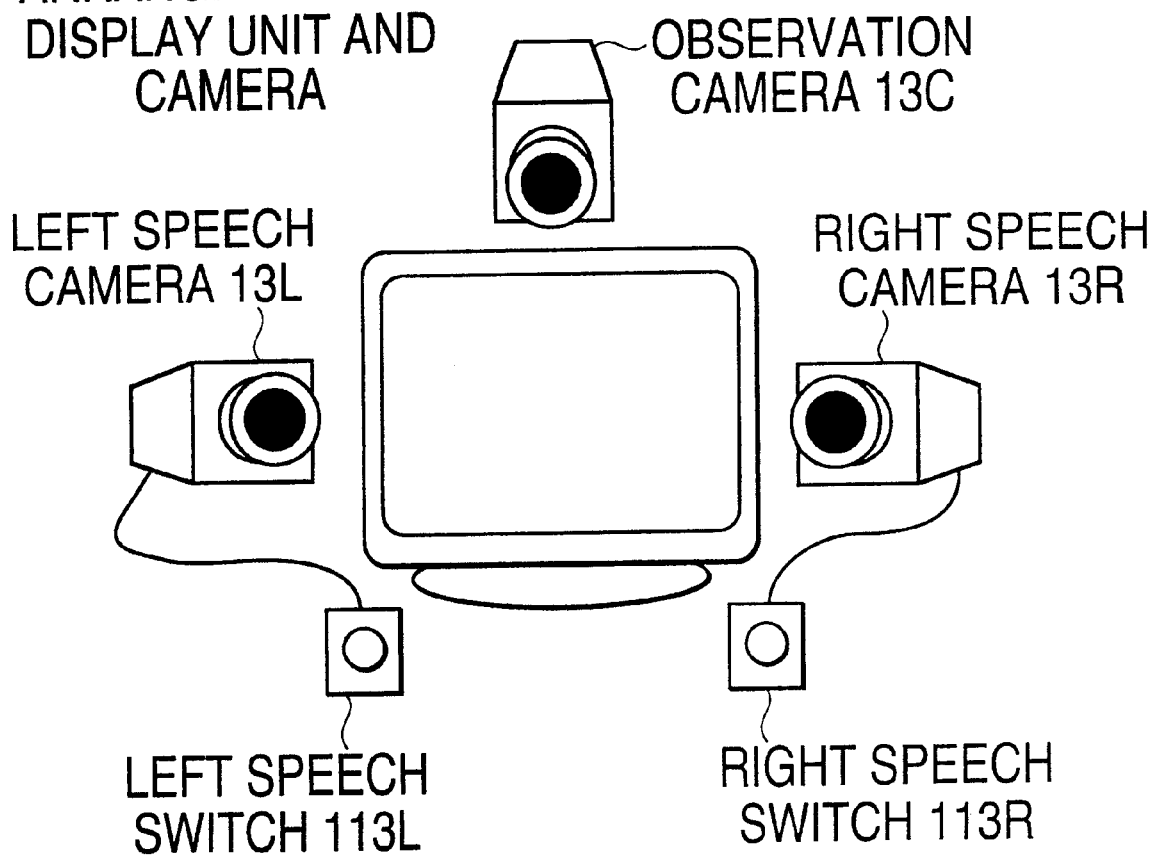
FIG. 15 is an explanatory diagram illustrating the configuration of a sixth embodiment of this invention.

FIG. 15 is an explanatory diagram illustrating the relative positions of a display device and cameras according to a sixth embodiment of this invention.

Each workstation of the participants includes the third embodiment shown in FIG. 7, and all workstations are connected by a transmission path. An observation camera 13C, a right speech camera 13R, a left speech camera 13L, a right speech switch 113R and a left speech switch 113L are provided around the workstation of each participant (user).

FIG. 16 is an explanatory diagram illustrating operations of the sixth embodiment.

A speaker area including left speaker's window a and right speaker's window b, which present images of two speakers, is provided on the display device of each user, and an observer area including three observer's windows c which present images of three observers, is also provided on the display device.

The observation camera 13C captures an image of the user when the user is one of the observers. The right speech camera 13R captures an image of the user from the right direction and the left speech camera 13L captures an image of the user from the left direction when the user is one of the speakers.

Assume first that users A and B are the speakers and users C, D, and E are the observers of the discussion, as shown at the top-center of FIG. 16. One of the observers C, D, and E can become a speaker in two ways. He may switch his camera from the observation camera 13C to either the right speech camera 13R or the left speech camera 13L by selecting a corresponding one of the right speech switch 113R or the left speech switch 113L. Alternatively, he may move the window showing his face into the speaker area, for example, by using a mouse device.

Assume second that user C who is an observer wants to speak with user B who is a speaker. The user C pushes a right speech switch 113R provided on his workstation WS-C. This causes a right speech camera 13R to capture an image of user 12C in lieu of the observation camera 13C. This also causes each window control unit 38 to swap an image of user A in left speaker's window a with an image of user C in one of the observer's windows c in the display device 14, as shown at the bottom-left of FIG. 16.

Assume third that user D who is an observer wants to speak with user A who is a speaker. User D drags the observer's window c displaying his image over to the right speaker's window b displaying the image of user B. This causes a left speech camera 13L to capture an image of the user D in lieu of an observation camera 13C. This also causes each window control unit 38 to swap an image of the user B in the right speaker's window b with an image of the user D in one of the observer's windows c, as shown at the upper-right of FIG. 16.

When a user switches a camera activation and a camera deactivation by depressing either his right speech switch 113R or his left speech switch 113L, a information conversion unit 37 converts camera control information on a camera activation and a camera deactivation into window control information on window positions, and the window control unit 38 swaps the window showing the speaker with the window showing the observer.

When a user drags a window over to another, the information conversion unit 37 converts window control information on window positions into camera control information for a camera activation and a camera deactivation, and the camera control device 36 switches the cameras accordingly.

FIG. 17 is a flowchart illustrating processes of the sixth embodiment.

The computer (workstation) waits for an input from the user 12, an input from the camera control device 36, or an input from another computer (Step S1), and determines whether or not the input is from the user 12 or from another computer (Step S1'). When the input is from the user 12 or from another computer, the computer determines whether or not the input is the window operation command (Step S2), and if the input is not the window operation command (Step S3), performs another process corresponding to the input and the process then goes back to step S1.

If the input is the window operation command, the window control unit 38 sends the window operation data to the display control device 15 for revising (moving, resizing, etc.) the windows 19. The window control unit 38 also sends the window information to the information conversion unit 37, and the information conversion unit 37 converts the window information into the camera control information and sends them to the camera control device 36. Then, the camera control device 36 switches the cameras so that a camera corresponding to the position of the window showing the user is selected (Step S5). S17.

In step S1', when the input is from the camera control device 36, the information conversion unit 37 converts the data into window control information, and sends this information to the window control unit 38. The window control unit 38 swaps to the window on the opposite side to the speech switch selected by the user with speaker's window (Step S16). In this operation, when the user pushed the right speech switch 113R, the right speech camera 13R is selected and the left speaker's window a becomes his window, as shown in the left part of FIG. 16.

Next, the workstation transfers the window and the windows in the display device of other workstations are re-arranged so as to have the same arrangement as in the display device of the user who pushed the speech switch. Then, the process continues by returning to step S1.

Seventh Embodiment

Explained below is a seventh embodiment of this invention in which a workstation controls an on-screen window size in relation to a camera zoom setting.

The seventh embodiment is for keeping relative image sizes between objects by controlling a window size in relation to the zoom setting of a camera. This embodiment uses the apparatus of the second embodiment shown in FIG. 5, and the window control unit 28 enlarges or reduces the window size according to a scaling of the image set by the camera zoom.

Figure 18A:
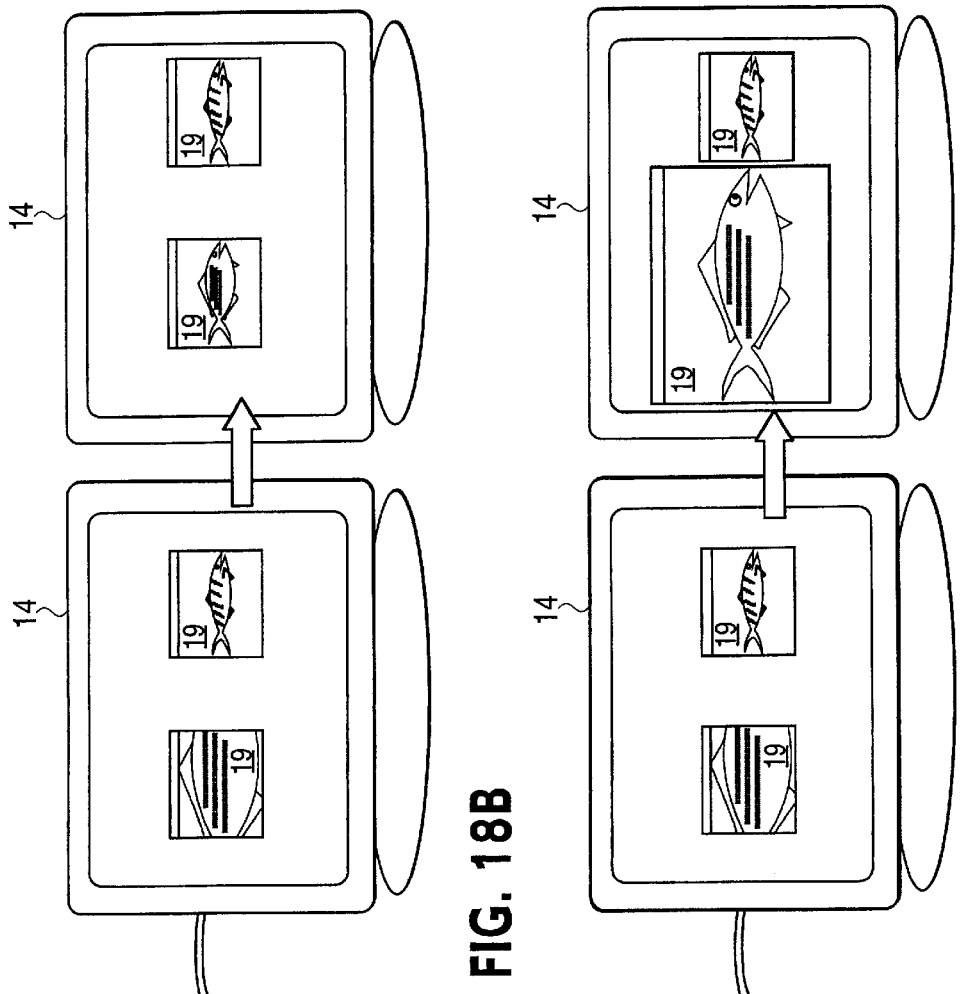
FIGS. 18A and 18B are explanatory diagrams illustrating a seventh embodiment of this invention.

FIG. 18A is a first one of explanatory diagrams illustrating a pair of images displayed when the window size is unrelated to the camera zoom setting.

Figure 18B:
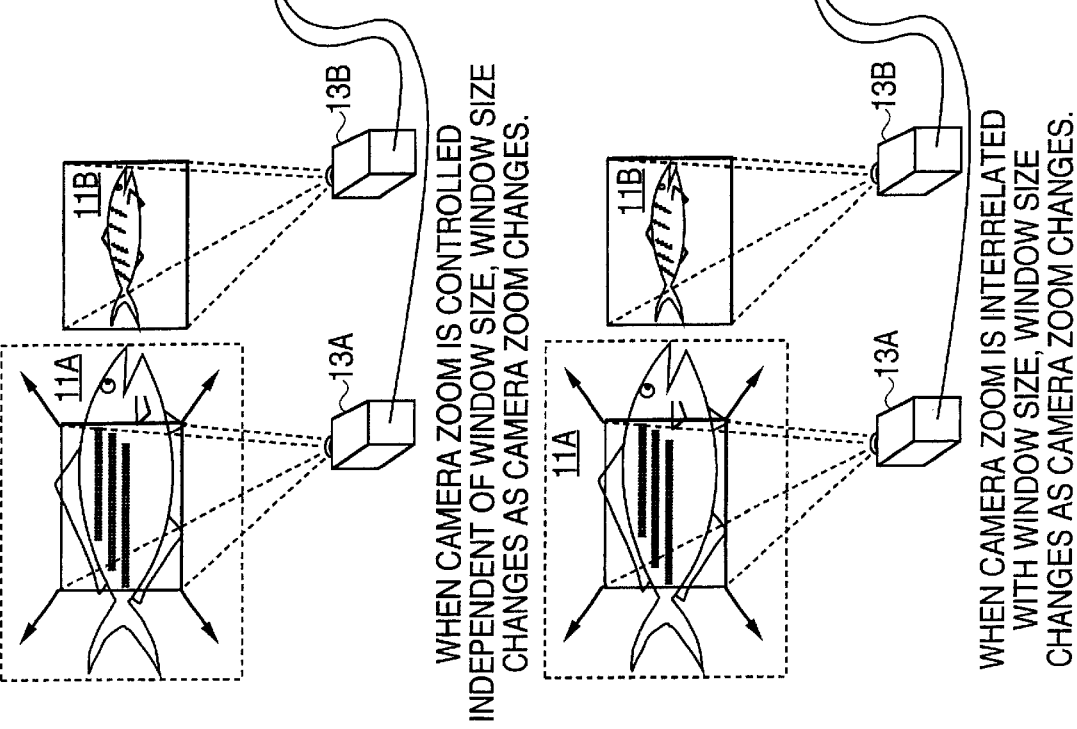

FIG. 18B is a second one of explanatory diagrams illustrating a pair of images displayed when the window size is related to the camera zoom setting. setting.

The information conversion unit 27 converts camera information on respective camera zoom settings of cameras 13A and 13B supplied from the camera control device 26, into window control information on window sizes. Then, the window control information is sent to the window control unit 28 to control the sizes of the windows on the display device 14.

As a result, the window size changes corresponding to the camera zoom setting, and the relative image sizes between objects can be correctly represented in the display device.

When the window control unit 27 controls the window size independently of the camera zoom setting, even if the zoom setting of the camera is changed, the size of the corresponding window does not change and an image inside of the window is scaled up or down proportionally, thereby failing to provide the relative image sizes between images in the display device.

As shown in FIG. 18A, when the camera 13A captures a bigger object 11A with a wide angle view (with low magnification), the bigger object 11A and a smaller object 11B captured by a camera 13B are shown to be the same size in the display device 14.

When the window control unit 27 controls the window size corresponding to the camera zoom setting according to this invention, the relative sizes of the objects can be represented in the display device 14.

As shown in FIG. 18B, when the camera 13A captures the bigger object 11A with a wide angle view (with low magnification), the image of the bigger object 11A is shown bigger than the image of the smaller object 11B captured by the camera 13B in the display device 14 due to the window size control.

Eighth Embodiment

Explained below is an eighth embodiment of this invention in which a workstation controls an on-screen window position in relation to a position and a direction of the camera.

The eighth embodiment is for keeping a relative position between objects by controlling the window position in relation to the position and the direction of the camera. This embodiment uses the apparatus of the second embodiment shown in FIG. 5, and the window control unit 28 changes the positions of the windows according to the camera information on the position and the direction of the camera.

FIG. 19A is a first one of explanatory diagrams illustrating a pair of images displayed when the window position is unrelated to the position and the direction of the camera.

FIG. 19B is a second one of explanatory diagrams illustrating a pair of images displayed when the window position is related to the position and the direction of the camera.

The information conversion unit 27 converts camera information on camera position and camera direction of respective cameras 13A and 13B supplied from the camera control device 26, into window control information on window sizes. Then, the window control information is sent to the window control unit 28 to control the positions of the windows on the display device 14.

As a result, the relative positions between the windows change corresponding to the camera position and the camera direction, and the relative image position between objects can be correctly presented.

When the window control unit 27 controls the window position independently of the camera position and the camera direction, even if the direction or the position of the camera is changed, the relative position of the windows in the display device does not change, thereby failing to provide the relative positions between objects in the display device.

As shown in FIG. 19A, even if the camera 13B is moved or changes its direction to capture other object 11C, the position of the window showing the image of the object 11C does not change, and the actual relationship in position between the object 11A and the object 11C is not represented in the display device.

When the window control unit 27 controls the window position corresponding to the camera position and the camera direction according to this invention, the relative position between the objects can be shown in the display device 14.

As shown in FIG. 19B, when the camera 13B is moved or changes its direction to capture the object 11C, the position of the window showing the image of the object 11C is moved according to the change of the camera position or the camera direction, thereby representing the relative position between the two objects 11A and 11C in the display device.

Ninth Embodiment

A ninth embodiment of this invention will be described below using FIGS. 20 and 21. This embodiment basically uses apparatus of the sixth embodiment whose configuration, operations and processes are shown in FIG. 15, FIG. 16 and FIG. 17, and the circumstances of the teleconference are the same.

In the sixth embodiment, the user switches the observation camera 13C, the right speech camera 13R and the left speech camera 13L, and swaps windows in a speaker area and an observer area manually, by either depressing one of the left speech switch 113L and the right speech switch 113R, or by dragging a window over another window.

The ninth embodiment comprises a left microphone 113L' placed to the left of the user and a right microphone 113R' placed to the right of the user as substitutes for the left speech switch 113L and the right speech switch 113R. In the ninth embodiment, switching of cameras 13L, 13R, and 13C and swapping the windows are performed by sound information from the right microphone 113R' and the left microphone 113L'.

Assuming that five people participate in the teleconference, that two people speak at a time, and that the other three people observe their discussion, this embodiment will be as described below.

Each of the participants in the teleconference has a workstation of the third embodiment, and cameras 13L, 13R, and 13C and the microphones 113L' and 113R' are attached to the workstation. In each workstation, the right microphone 113R' and the left microphone 113L' are connected to a microphone operation control unit (not shown), and all workstations are connected by a transmission path.

Each user listens to a discussion between two speakers using a stereo headphone set that emits the voice of the right speaker displayed in the speaker area from its right side and the voice of the left speaker displayed in the speaker area from its left side. A headphone operation control unit (not shown) controls sounds emitted from the stereo headphone set using the window information. The sound source for the stereo headphone set is changed by the headphone operation control unit according to the swapping of the windows to match the sound with the voice of a new speaker, when windows are swapped between the speaker area and the observer area.

Assume first that users A and B are talking and that users C, D and E are observing the discussion, as shown at the top-center of FIG. 20.

An observer can become a speaker in two ways. He may switch his camera from the observation camera 13C to either one of the right speech camera 13R and the left speech camera 13L by speaking toward either the right microphone 113R' or the left microphone 113L'. Alternatively, he may drag his window into a speaker area, for example, by using a mouse device.

Assume second that user C who has been an observer wants to speak with user B who has been a speaker. User C initially speaks toward a right microphone 113R'. The sound information is sent to the window control unit 38 through the microphone operation control unit. Then, the window control unit 38 swaps an image in window a, which is on the opposite side of the microphone 113R', with the image of user C, based on the information on the user's voice from the microphone operation control unit, as shown at the bottom-left of FIG. 20. This also causes a right speech camera 13R, in lieu of an observation camera 13C, to capture an image of user 12C, and the headphone operation control unit controls the headphone set so that the voice of the user C is emitted from the left side of the headphone set.

Assume third that user D who has been an observer wants to speak with user A who has been a, speaker. User D drags a window displaying his image over to window b displaying an image of user B, as shown at the upper-middle right of FIG. 20. The window information on changing the window position is sent to the camera control device 36 through the window control unit 38 and the information conversion unit 37, then the camera control device 36 controls the cameras so that the left speech camera 13L, in lieu of the observation camera 13C, capture an image of user 12D. As a result, the user D faces the user A in the speaker area. In addition, the headphone operation control unit controls the sound of the headphone set so that the voice of user D is emitted from the right side of each headphone set.

FIG. 21 is a flowchart illustrating processes of the ninth embodiment.

A computer (workstation) waits for an input from the user, an input from the microphone operation control unit, or an input from another computer (Step S1), then determines whether or not the input is from the user 12 or another computer (Step S1'). When the input is from the user or from another computer, the computer determines whether the input is a window operation command (Step S2). If the input is not the window operation command, the computer performs another process corresponding to the input (Step S3), and the process continues by returning to step S1.

If the input is the window operation command, the window control unit 38 sends the window control information to the display control device 15 to swap images of users in the display device. Then, the window control unit 38 sends the information on the position of the windows to the information conversion unit 37 to provide the camera control information to the camera control device 36.

After receiving the camera control information, the camera control device 36 controls the cameras so that one of the right speech camera 13R and the left speech camera 13L captures the user's image based on the camera control information (Step S5).

Next, the headphone operation control unit swaps the sound emitted from either the right or left side of a headphone set with the sound from the user who wants to be a speaker (Step S5'). The computer transfers window control operation data on an on-screen window position to the other workstations (Step S14). The process continues by returning to step S1.

When the computer has determined that the input is from the microphone operation control unit in Step S1', the window control unit 38 swaps a window, which is on the opposite side in the speaker area to a microphone to which a sound is input first, for this user's window (Step 15). After Step 15, the process goes to Step 5.

As described above, since the camera is controlled based on the window information, the user can control the window to obtain an image that he wishes to see without directly controlling the camera. Further, since the window is controlled based on the camera control, the original relationship between objects can be shown in windows on the display device.

More specifically, this invention produces the following advantages:

[1] Because images captured by cameras are displayed in windows using an interrelation between the camera information and the window information, the user can obtain the relative positions and relative sizes between objects from the display device, thereby being presented with natural images of the objects.

It is especially effective in a teleconference system, because the participants can face each other on the display device when they talk to each other.

[2] Since a camera can be controlled according to information on the position of the window, which can be directly controlled by a user, the window can be regarded as an interface between the user and the camera, and the user can control the position and the direction of the camera by changing the window position while watching the image of the object.

[3] Since a camera can be controlled according to information on the size of the window, which can be directly controlled by a user, the user can control the zoom setting of the camera by changing the window size and can get a-desired field of view while watching the image of the object.

[4] When the viewing range of the camera is changed by the switching between a plurality of cameras according to this invention, a manipulator for the camera is not needed and a simplification of the system can be realized.

[5] Even if the zoom, the direction, or the position of the camera is changed, the proper relationship in size or position between viewed objects can be obtained on the display device.

What is claimed is:

1. An apparatus for coordination control between a window on a display and a camera for displaying an image captured by the camera in the window, the apparatus comprising:

window control means for controlling the window according to a window operation command issued by a user and for producing window information including at least one of a position of the window and a size of the window;

information conversion means for converting the window information into interrelated camera control information for displaying the image, the camera control information including an on/off status determined by the position or size of the window; and camera control means for turning the camera OFF or ON based on the camera control information supplied from the information conversion means.

2. The apparatus according to claim 1, wherein the information conversion means converts at least one of information on a position of the window and information on a size of the window on the display means into at least one of information on an on/off status of the camera, information on a position of the camera, information on a direction of the camera, and information on a zoom of the camera.

3. The apparatus according to claim 1, wherein the information conversion means converts information on a position of the window into the camera control information, and the camera control means controls at least one of a change of a position of the camera and a change of a direction of the camera based on the camera control information.

4. The apparatus according to claim 1, wherein the information conversion means converts information on a size of the window into the camera control information, and the camera control means controls a zoom of the camera based on the camera control information.

5. The apparatus according to claim 1, wherein the information conversion means converts information on a relative position of the window to another window on the display means into the camera control information, and the camera control means controls at least one of a position of the camera and a direction of the camera based on the camera control information.

6. The apparatus according to claim 1, wherein the information conversion means converts information on a relative position of the window to another window on the display means into camera control information, and the camera control means controls an on/off status of the camera based on the camera control information.

7. The apparatus according to claim 1, wherein the camera control means controls the camera based on sound information provided by the user.

8. A method for coordination control between a window on a display and a camera so as to display an image captured by the camera in the window, the method comprising:

controlling the window according to a window operation command issued by a user;

producing information on the window including at least one of a position of the window and a size of the window;

converting the information on the window into interrelated camera control information for displaying the image, the camera control information including an on/off status determined by the position or size of the window; and turning the camera OFF or ON based on the camera control information.

* * * * *